(12) United States Patent
DaCosta et al.

(10) Patent No.: US 11,368,537 B2
(45) Date of Patent: Jun. 21, 2022

(54) HIGH PERFORMANCE WIRELESS NETWORK

(71) Applicant: MeshDynamics

(72) Inventors: Francis DaCosta, Santa Clara, CA (US); Sriram Dayanandan, San Jose, CA (US)

(73) Assignee: Dynamic Mesh Networks, Inc., Santa Clara, CA (US)

( * ) Notice: Subject to any disclaimer, the term of this patent is extended or adjusted under 35 U.S.C. 154(b) by 0 days.

(21) Appl. No.: 17/027,381

(22) Filed: Sep. 21, 2020

(65) Prior Publication Data

US 2021/0075867 A1    Mar. 11, 2021

Related U.S. Application Data

(63) Continuation-in-part of application No. 15/908,108, filed on Feb. 28, 2018, now Pat. No. 10,785,316.
(Continued)

(51) Int. Cl.
| | |
|---|---|
| *H04L 29/08* | (2006.01) |
| *H04L 67/145* | (2022.01) |
| *H04L 12/46* | (2006.01) |
| *H04L 45/02* | (2022.01) |
| *H04W 4/14* | (2009.01) |
| *H04L 45/48* | (2022.01) |

(Continued)

(52) U.S. Cl.
CPC ........ *H04L 67/145* (2013.01); *H04L 12/4625* (2013.01); *H04L 45/02* (2013.01); *H04L 45/48* (2013.01); *H04L 49/70* (2013.01); *H04W 4/14* (2013.01); *H04W 28/065* (2013.01); *H04W 40/248* (2013.01); *H04W 4/70* (2018.02); *H04W 84/18* (2013.01)

(58) Field of Classification Search
CPC ... H04W 40/248; H04W 4/14; H04W 28/065; H04L 67/145; H04L 12/4625; H04L 45/02; H04L 45/48; H04L 49/70
See application file for complete search history.

(56) References Cited

U.S. PATENT DOCUMENTS

| | | |
|---|---|---|
| 5,546,397 A | 8/1996 | Mahany |
| 5,867,785 A | 2/1999 | Averbuch et al. |

(Continued)

*Primary Examiner* — John D Blanton
(74) *Attorney, Agent, or Firm* — Cherskov Flaynik & Gurda, LLC

(57) ABSTRACT

A wireless mesh network is described. The mesh network uses a plurality of data communications nodes that are organized in a tree-like structure. The network also includes an access server which communicates with the nodes. The mesh network nodes are one or more root access point nodes having a wired connection to an external network; and one or more mesh access point nodes. Both types of nodes communicate with an external network. Each non-root node automatically connects to an associated parent node selected from one or more nodes within a direct wireless communication range of the node. The node selects a parent node based on one or more parent selection criteria from the access server and establishes a connection to the selected parent node. The node then calculates its routing path to the external network. The nodes include unique identifiers and two or more radios.

19 Claims, 19 Drawing Sheets

Related U.S. Application Data which is a continuation-in-part of application No. 15/728,863, filed on Oct. 10, 2017, now abandoned, which is a continuation of application No. 14/740,062, filed on Jun. 15, 2015, now Pat. No. 9,819,747, which is a continuation-in-part of application No. 13/571,294, filed on Aug. 9, 2012, now Pat. No. 9,172,738, which is a continuation-in-part of application No. 12/696,947, filed on Jan. 29, 2010, now Pat. No. 8,520,691, which is a continuation-in-part of application No. 11/084,330, filed on Mar. 17, 2005, now abandoned, which is a continuation-in-part of application No. 10/434,948, filed on May 8, 2003, now Pat. No. 7,420,952.

(60) Provisional application No. 60/421,930, filed on Oct. 28, 2002.

(51) Int. Cl.
  H04L 49/00 (2022.01)
  H04W 28/06 (2009.01)
  H04W 40/24 (2009.01)
  *H04W 4/70* (2018.01)
  *H04W 84/18* (2009.01)

(56) References Cited

U.S. PATENT DOCUMENTS

| | | | |
|---|---|---|---|
| 6,046,992 A | 4/2000 | Meier et al. | |
| 6,393,261 B1 | 5/2002 | Lewis | |
| 6,400,702 B1* | 6/2002 | Meier | H04B 1/3833 |
| | | | 370/338 |
| 6,434,129 B1 | 8/2002 | Struhsaker et al. | |
| 6,876,643 B1 | 4/2005 | Aggarwal et al. | |
| 6,909,705 B1 | 6/2005 | Lee | |
| 6,912,373 B2 | 6/2005 | Lee | |
| 6,982,960 B2 | 1/2006 | Lee et al. | |
| 7,023,856 B1 | 4/2006 | Washabaugh et al. | |
| 7,058,050 B2 | 6/2006 | Johansson et al. | |
| 7,103,371 B1 | 9/2006 | Liu | |
| 7,190,690 B2 | 3/2007 | Tuomela et al. | |
| 7,200,130 B2 | 4/2007 | Forstadius et al. | |
| 7,212,490 B1* | 5/2007 | Kao | H04L 43/0852 |
| | | | 370/406 |
| 7,428,300 B1 | 9/2008 | Drew et al. | |
| 8,589,247 B2 | 11/2013 | Mesaros | |
| 2001/0021639 A1 | 9/2001 | Kaku | |
| 2001/0038639 A1* | 11/2001 | McKinnon, III | H04L 41/5009 |
| | | | 370/468 |
| 2002/0007416 A1 | 1/2002 | Putzolu | |
| 2002/0055978 A1 | 5/2002 | Joon-Bo et al. | |
| 2002/0072329 A1* | 6/2002 | Bandeira | H04B 7/2609 |
| | | | 455/25 |
| 2002/0085719 A1 | 7/2002 | Crosbie | |
| 2002/0097681 A1 | 7/2002 | Treister et al. | |
| 2002/0159401 A1 | 10/2002 | Boger | |
| 2002/0159409 A1* | 10/2002 | Wolfe | H04W 92/20 |
| | | | 370/352 |
| 2003/0012193 A1 | 1/2003 | Novaes | |
| 2003/0210671 A1* | 11/2003 | Eglin | H04L 12/4641 |
| | | | 370/349 |
| 2004/0001442 A1* | 1/2004 | Rayment | H04W 84/00 |
| | | | 370/351 |
| 2004/0058678 A1 | 3/2004 | deTorbal | |
| 2004/0100929 A1 | 5/2004 | Garcia-Luna-Aceves | |
| 2004/0137877 A1 | 7/2004 | Crowhurst et al. | |
| 2004/0147424 A1 | 7/2004 | Syldath et al. | |
| 2004/0156345 A1 | 8/2004 | Steer et al. | |
| 2004/0203787 A1 | 10/2004 | Naghian et al. | |
| 2005/0128940 A1 | 6/2005 | Wen et al. | |
| 2005/0153725 A1 | 7/2005 | Naghian et al. | |
| 2005/0181725 A1 | 8/2005 | Dabak et al. | |
| 2005/0237992 A1 | 10/2005 | Mishra et al. | |
| 2005/0286464 A1 | 12/2005 | Saadawi et al. | |
| 2008/0080414 A1* | 4/2008 | Thubert | H04W 76/12 |
| | | | 370/328 |
| 2008/0112363 A1* | 5/2008 | Rahman | H04W 8/005 |
| | | | 370/331 |
| 2009/0115654 A1 | 5/2009 | Lo et al. | |
| 2009/0201898 A1 | 8/2009 | Gong et al. | |
| 2009/0311658 A1 | 12/2009 | Polivka | |
| 2010/0150170 A1 | 6/2010 | Lee et al. | |
| 2010/0223581 A1 | 9/2010 | Manolescu et al. | |
| 2011/0208822 A1 | 8/2011 | Rathod | |
| 2011/0225293 A1 | 9/2011 | Rathod | |
| 2011/0276396 A1 | 11/2011 | Rathod | |
| 2011/0276628 A1 | 11/2011 | Pell | |
| 2012/0202514 A1 | 8/2012 | Kadirkamanathan et al. | |
| 2013/0343430 A1 | 12/2013 | Bettendorff et al. | |
| 2015/0036649 A1 | 2/2015 | Chen et al. | |

* cited by examiner

HIGH PERFORMANCE WIRELESS NETWORK

CROSS-REFERENCES

This application is a continuation in part of Ser. No. 15/908,108 filed on Feb. 28, 2018, presently pending, which is a continuation in part of Ser. No. 15/728,863. The application Ser. No. 15/728,863 filed on Oct. 10, 2017, abandoned on Jun. 18, 2020 was a continuation of Ser. No. 14/740,062. The application Ser. No. 14/740,062 filed on Jun. 15, 2015, issued as U.S. Pat. No. 9,819,747 on Nov. 14, 2017 was a continuation in part of Ser. No. 13/571,294. The application Ser. No. 13/571,294 filed on Aug. 9, 2012, issued as U.S. Pat. No. 9,172,738 on Oct. 27, 2015, was a continuation in part of Ser. No. 12/696,947. The application Ser. No. 12/696,947 filed on Jan. 29, 2010, issued as U.S. Pat. No. 8,520,691 on Aug. 27, 2013 was a continuation in part of Ser. No. 11/084,330. The application Ser. No. 11/084,330 filed on Mar. 17, 2005, abandoned on Nov. 26, 2010 was a continuation in part of Ser. No. 10/434,948. The application Ser. No. 10/434,948, filed on May 8, 2003, issued as U.S. Pat. No. 7,420,952 on Sep. 2, 2008, was a non-provisional of 60/421,930, filed on Oct. 28, 2002. The contents of each application is hereby incorporated by reference.

FIELD OF THE INVENTION

The present invention describes an adaptive software layer for a distributed set of wireless communication devices that communicate with each other in a wireless network. The software control layer addresses low latency requirements (for applications such as voice) and high throughput requirements (for applications involving data transfer). One embodiment of the present invention provides the software control for wireless (devices, such as, but not limited to Access Points, employed in a convergent enterprise network supporting voice, video and data. A topical application of the software control layer is a home or personal networking environment (PAN) using Ultra Wide Band or Wi-Fi as the communications medium. Another topical application of the adaptive software control layer is extending wireless communication range using mesh networks for Metropolitan Area Networks (MAN). Lastly, the software control layer is also relevant to both home and enterprise Wireless Local Area Networks (WLANS).

BACKGROUND OF THE INVENTION

There is increasing demand within the enterprise, the home and within cities to employ one wireless network to support both voice, video and data traffic. Currently, the "voice" network, e.g. the telephone system, is separate from the "data" network e.g. Internet connectivity and access to enterprise data over a Local Area Network (LAN). Convergence is, as the name implies, the ability to converge these two networks into one network, centrally managed by one access server servicing a network of relay and leaf nodes.

The challenge lies in providing—within the same wireless network—the ability to address potentially conflicting latency and throughput needs of diverse applications. For example, voice needs to be transmitted with low delay (latency). Occasionally lost voice packets, while undesirable, is not fatal for voice transmissions. Conversely, data transmissions mandate delivery of all packets and while low latency is desirable it is not essential. In essence transmission across the wireless network should ideally be driven by the needs of the application. The table below lists some types of applications and their latency requirements.

| Delivery Type | Description |
| --- | --- |
| Asynchronous | No constraints on delivery time ("elastic"): e.g. email |
| Synchronous | Data is time-sensitive, but requirements flexible in terms of delays |
| Interactive | Delays noticeable but not adversely affecting usability or functionality |
| Isochronous | Time-sensitive: delays adversely affect usability. E.g. voice/video |
| Mission critical | Data delivery delays disables functionality |

A wireless network provides service to a diverse set of applications, with varied latency requirements. One approach to make dumb wireless devices, that are nodes of the network, more application aware by implementing QoS (Quality of Service) reservation schemes dictated by the application server.

Changing the rate the queue is serviced can also be accomplished by specialized communications between wireless communication devices such as Access Point. (AP) nodes and the access server to ensure that voice and data, for example, are serviced at different time intervals. Unfortunately, this adversely affects scalability and redundancy of the system: the access server is now micromanaging the network and has become a single point of failure. A paramount concern of any network is distributed control, especially a network handling voice, video and data.

Another shortcoming of a centralized approach—central control and central execution—is the cost of maintaining a central control point with all intelligence and control at one location and dumb communication devices distributed in the enterprise. The cost of the central control point is high, and the dumb access points are not any less expensive than smart access points—since the smarts is in the software. Thus a distributed approach is far less expensive—. In addition to being more cost effective a distributed approach is more fault tolerant and has built in fail-safe redundancy. The only way to get redundancy out of centralized approaches is to buy multiple central control points—an expensive approach.

Building a reliable wireless network comes with other constraints specific to wireless. Some routing paths may be best for voice and video, others for data. In Ethernet applications separate routing paths is easily accomplished. But in a wireless network, operating over radio, the cost of associating and disassociating with a relay node—to switch to new routing paths—is prohibitive. Multiple radios, supporting separate voice and data channels is possible but expensive. It is preferable, therefore, if each AP node can support both voice and data transmissions with a one "channel".

Furthermore, mesh networks have been around for years now, the Internet being an excellent example. Routers exchange information about each other and build up their routing tables, and use the entries in the routing table to make routing decisions. Although they work, these algorithms are sub-optimal at best and are more oriented towards wired or wire-like interfaces, which are exclusive "non-shared" communication mediums. Wireless Personal Area Networks (WPANs) pose an entirely different set of challenges for AD-HOC networks because of the following reasons: shared non exclusive medium with finite communication channels; dynamically changing environment; shorter distances; used by resource constrained low power devices. There is therefore a need for an approach to solving these sets of challenges, using a low footprint distributed adaptive control layer that is aware of the above set of problems.

SUMMARY OF THE INVENTION

Accordingly, there is a need for, and an objective of the present invention, to develop an adaptive wireless network, based on "smart" communication devices such as Access Points (AP) that provide embedded intelligence at the edge of the network, are application aware and provide cost effective distributed sensing and control of the network. An additional objective of this invention is to allow the characteristics of the network to be set by a centralized access server, which cart thus "tune" the character of the network to be anything between the two extremes of low latency to high throughput, based on the needs of applications running in the enterprise. The invention also supports the possibility of running multiple types of networks supporting anything between the two extremes of low latency and high throughput, using multiple radios at each node for each distinct type of network.

As an illustration of central control but distributed intelligence, consider FIG. 1, where the star network depicted has low latency (See FIG. 1B for the latency in the status panel). However, since the signal strength-varies inversely with the distance from the Access Point, as shown in FIG. 1A in the look up table (control panel) on the top left corner, the price is poor throughput. If all devices are required to connect directly to the root node as shown, regardless of their distance from the root node, then the overall throughput of the network can be low.

Since the signal strength varies inversely with the distance, it may be advantageous, from the perspective of better signal strength and overall better throughput for some AP nodes to connect to an intermediate AP rather than to the root, as shown in FIG. 2C. In FIG. 2, the throughput of the network has increased, see FIG. 2B, because two nodes are connecting, to other nodes (relays) with an overall increased throughput from 44.1 to 62.2. (See. FIGS. 1B and 2B).

The number 44.1 is a measure of the throughput computed based on the look up table shown in FIGS. 1 and 2 where distance from the root causes a rapid decrease in throughput. The throughput is expressed as a percentage, where a connection to the root at zero distance would be the maximum possible throughput: 100%.

While the throughput increased to 62.2, the tradeoff is more hops, resulting in a loss of latency for higher throughput. In FIG. 2, the latency has increased as a measure of the number of hops from an Access Point (AP) to the root node. It is 1.6, since some nodes now are 2 hops away from the root node.

The objective of this invention is to allow the Access Server to set some latency/throughput constraints that causes each AP node to change their relationships to each other and consequently the character of the network. Control parameters, set by an access server can then tune the wireless network to provide a mix between the two extremes of max throughput and low latency. As shown in FIG. 3, parameters set by the access server cause the network to self configure providing an average latency to 1.3 from 1.6. (See FIGS. 3B and 2B). Even though the throughput has reduced from 62.2 to 57.0%, it is still better than 44.1, the case in FIG. 1.

The approach taken to modify the network is completely decentralized—the changes in the network take place with algorithms running in each AP node. The Access Server does not change the characteristics of each node, it simply sets the parameters governing the characteristic of the network—and let the AP nodes reconfigure their relationships to meet the objectives set by the Access Server. Thus the Access Server can control the behavior of the network without necessarily controlling the behavior of each node of the network. Benefits of this approach include a highly scaleable, redundant wireless network. Some other benefits include:

1. Installs out of the box. No site survey or installation involved, since system self configures
2. Network is redundant. Mesh network formalism is supported, ensuring multiple paths.
3. Load balancing supported: Network nodes reroute data to avoid load-congested nodes.
4. No single point of failure. If a node "dies", another optimal routing path is selected
5. Decentralized execution: Algorithms controlling the network nodes resident in every node.
6. Central control: Setting system level "tuning" parameters changes network configuration
7. Network application aware: latency/throughput profiles defined in the access server
8. Application Based on the application profile in the access server, the network configures itself to satisfy all application requirements as best as possible.
9. Network is very scaleable—since execution is completely decentralized Uses of a self configuring application aware wireless network range from providing voice/data access to warehouses, factory floors, communications with process control equipment to home networking applications involving voice/data/video streaming. Some applications under consideration include:

Monitoring process control equipment with a Publish/Subscribe Stream server built on top of the wireless network. Examples include chemical plants, medical devices, industrial controls.

Voice over IP (VOIP) based low cost communication devices for mobility within enterprises Video streaming over wireless for remote surveillance.

Furthermore, another object of the embodiment of the present invention, is to solve the problems associated with ad-hoc wireless personal area networks by using a low footprint distributed adaptive control layer with algorithm that is aware of such problems (e.g. shared non exclusive medium with finite communication channels; dynamically changing environment; shorter distances; used by resource constrained low power devices).

These and other embodiments of the present invention are further made apparent in the remainder of the present document, to those of ordinary skill in the art.

BRIEF DESCRIPTION OF DRAWINGS

In order to more fully describe embodiments of the present invention, reference is made to the accompanying drawings. These drawings are not to be considered limitations in the scope of the invention, but are merely illustrative.

FIG. 1A illustrates the control panel; FIG. 1B illustrates the status panel and FIG. 1C illustrates the wireless network.

FIG. 2A illustrates the control panel; FIG. 2B illustrates the status panel and FIG. 2C illustrates the wireless network.

FIG. 3A illustrates the control panel; FIG. 3B illustrates the status panel and FIG. 3C illustrates the wireless network.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

The object of this invention is a new type of wireless AP nodes that:
  Configure them selves based on considerations, set by the access server for the network.
  Support automatic load balancing: AP nodes avoid data congestion hot spots.
  Support fail over: if one node dies, nodes connected to it automatically switch to another.
  Is fully functional when powered up: no installation procedure or site survey required.
  Support software upgrades to them selves through a communications interface
  Support both isochronous and asynchronous application requirements in the same network
  Support the wireless equivalent of switches
  Supports centralized control and is application aware based on settings provided by the access server.

Each AP Node is implemented as a self-contained embedded system, with all algorithms resident in its operating system. The normal day-to-day functioning of the AP node is based entirely on resident control algorithms. Upgrades are possible through a communications interface described later.

Description of System Components

Figure 1:
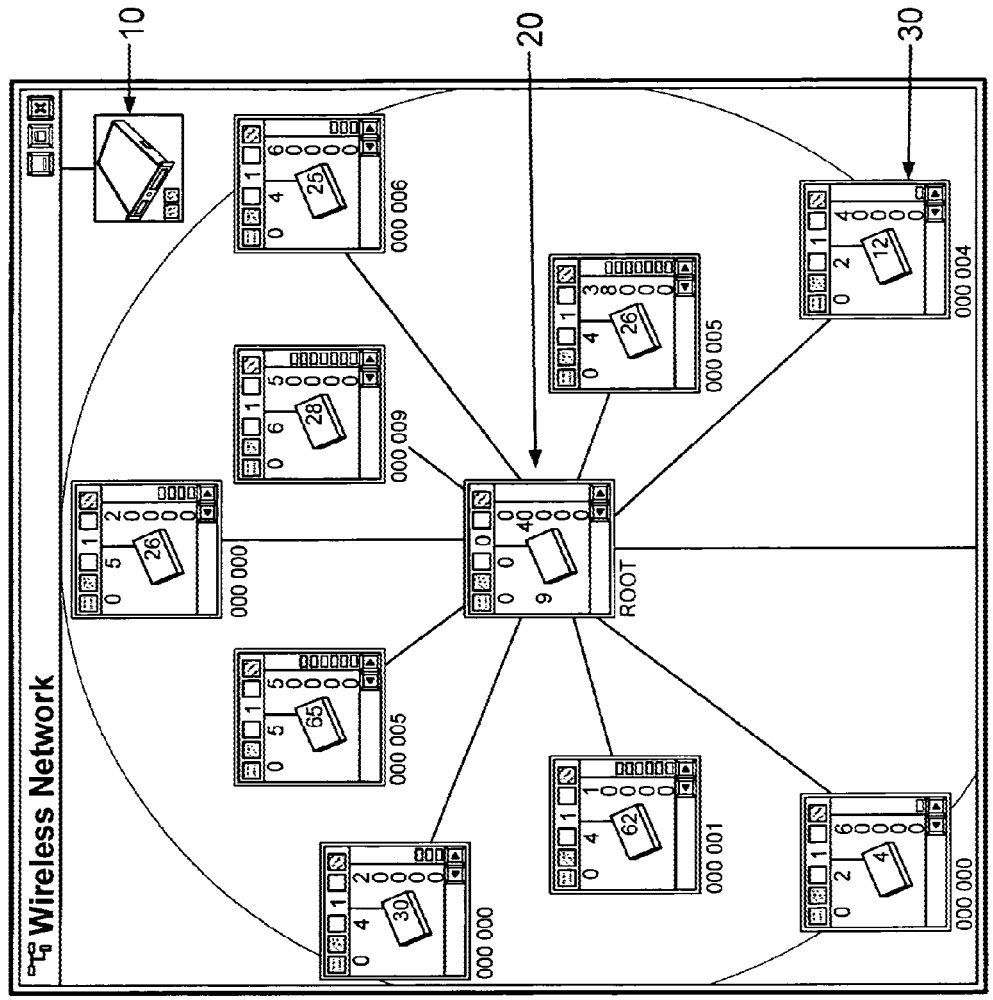
FIG. 1 illustrates a wireless network in star configuration, with low latency but poor throughput according to an embodiment of the present invention.
Figure 1:
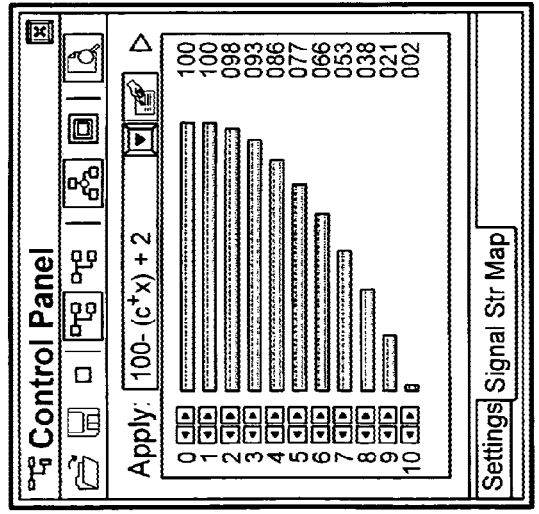
Figure 1:
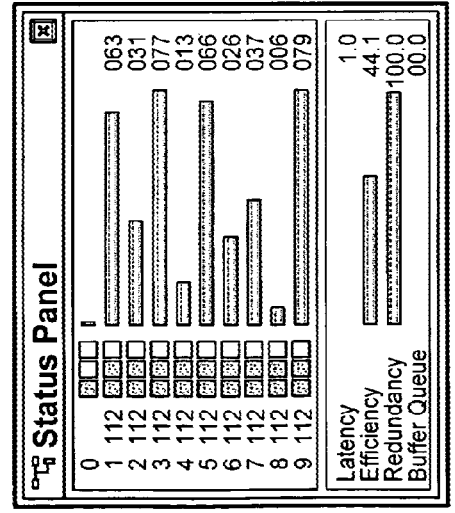

There are three typical components of the system proposed. In FIG. 1:
  1. The Access server (10) "manages" the network, by setting control parameters for the network
  2. The "Root" Node (20), is connected to the Access Server through an Ethernet link
  3. Wireless communication Devices such as AP nodes (30) that connect to the Root or other AP nodes devices to form a communications path terminating at an Ethernet link.

To enable voice and data types of requirements to be serviced satisfactorily within the same network configuration, the access server (10) maintains a list of applications and their latency and throughput requirements. Based on those application "profiles", the access server (10) sets the Network "profile" that each wireless communication device (30) in the network strives towards.

In one implementation of the invention, the root node (20) acts as the interface between the wireless communication devices (30) and the Ethernet. All Wireless devices (30) communicate to the Ethernet-through a root node (20), which is has a radio interface and an Ethernet link.

In that implementation of the invention, other wireless communications devices or AP nodes (30) have two radios: one to communicate with its clients which includes wireless devices such as laptops, VOIP wireless phones etc. Clients to one AP node (30) also include other AP nodes (30) connecting to it. In FIG. 4B, for example, Node 002 has nodes 005, connected to it. In addition all nodes (30) may have local clients—laptops etc.—connected to them directly. Each node, therefore, is dual purpose: It acts as a relay node—relaying traffic from a (child) node and also acts as an Access Point to local devices. In this implementation of the invention, redundancy is assured because of the mesh characteristic of the network.

In an alternate implementation of the invention, all Wireless AP Nodes are roots—they are all wired, in this case the network is not a mesh network and redundancy is dependant on having a large number of nearby AP nodes. However there is still communication between the nodes so load balancing and wireless switching, as described later, is supported.

Description of Variables Used by Algorithm

Figure 4A:
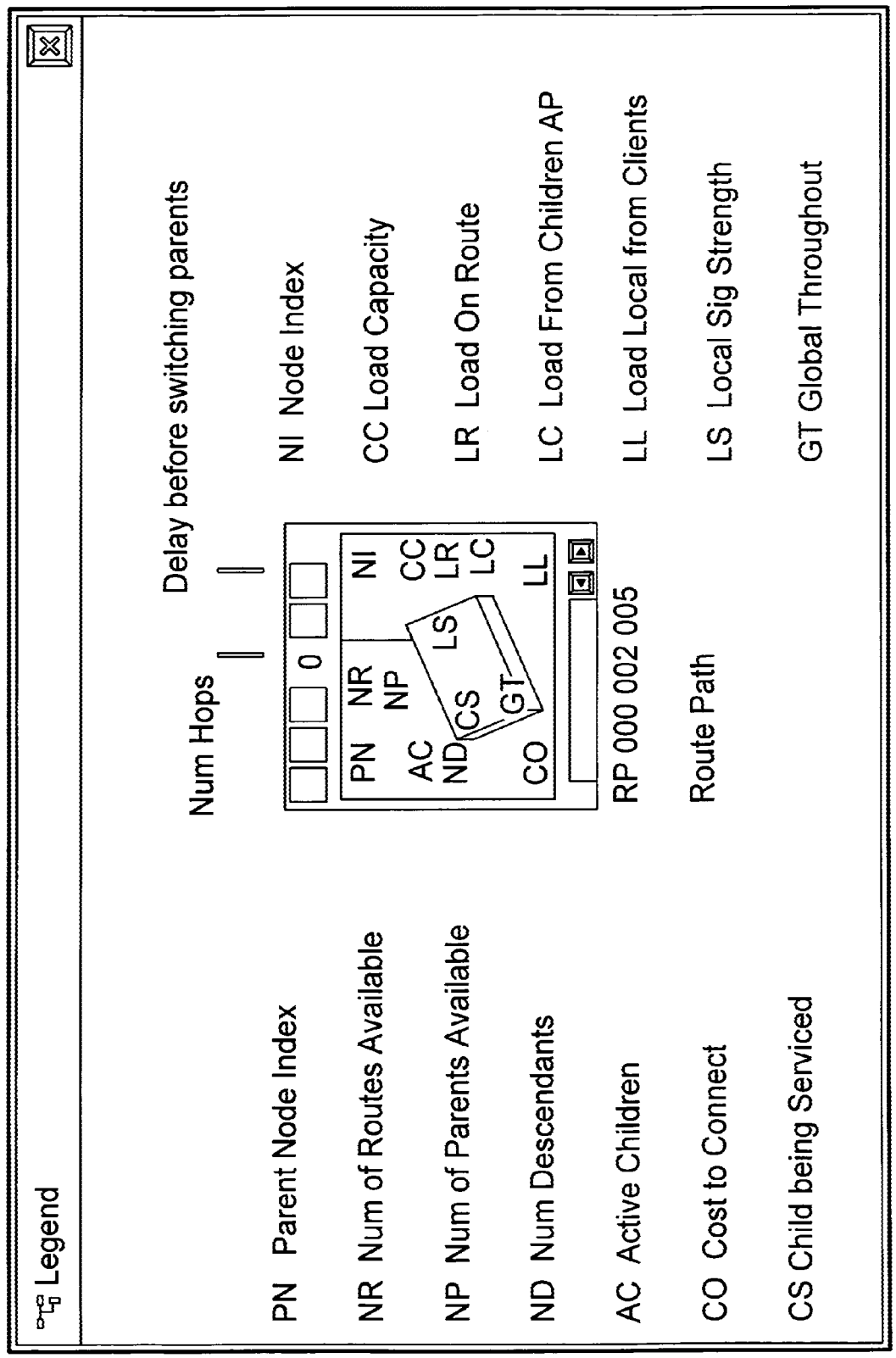
FIG. 4A indicates terminology for variables used by parent selection and load balancing algorithms according to an embodiment of the present invention.
Figure 4B:
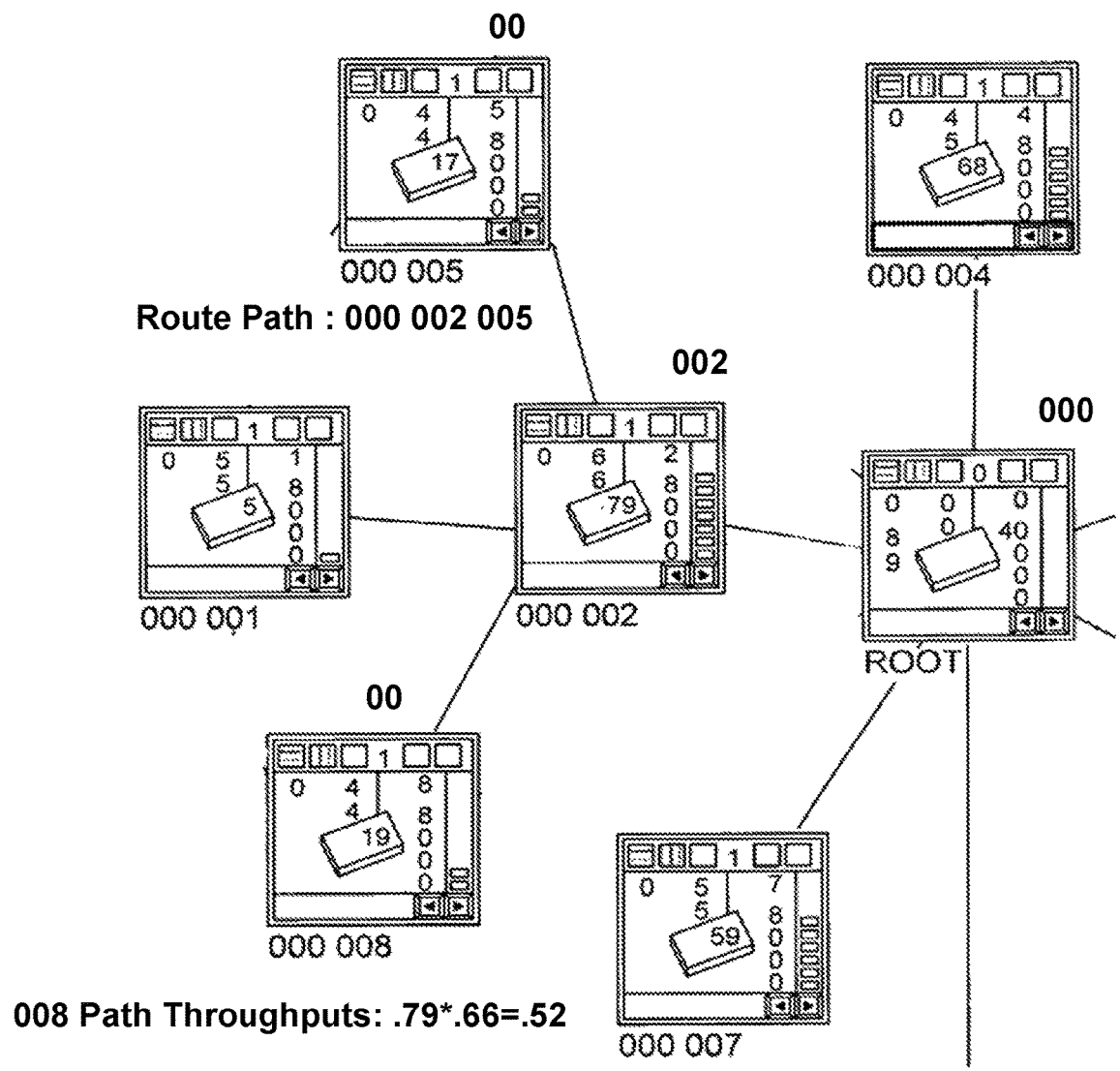
FIG. 4B illustrates Routing paths selected for maximizing throughput according to an embodiment of the present invention.

FIGS. 4A, 4B, describe the variables used by the algorithms. With reference to FIG. 4A, some relevant variables are:

NI: Node Index: the unique identifier for each wireless communication node

PN: Parent Node Index: Node Index for a node connects to in order to transmit data, For example, in FIG. 4B, the parent of Node 005 is 002.

RP: Route Path. In FIG. 4B, the route path for 005 is 000 002 005, its connection route.

NP: Number of parents available: Each Node has choices regarding which parent it selects to connect to, based on latency/throughput requirements. In FIG. 4B, Node 005 can connect to 004, 001, 002, and 000 (the root), all of whom are within the wireless range.

NR: Number of unique paths some of the parents may be children of another node in the list of NP. NR is therefore the list of unique roots the node has. In FIG. 4B, 001 is a child of 005. The number of unique roots is therefore 3.

AC: Number of Active children. This is the number of immediate children a node has: in FIG. 4B, Node 005 has 3 children: 005, 001, 008

ND: Number of Descendants: Child nodes may also have their own children. ND is the total number of descendants that are connected, directly or indirectly to the parent node.

CO: Cost to connect. When a node is congested it raises the cost of connectivity for a prospective child, thereby dissuading new connections till the congestion is alleviated. The cost to connect is a number transmitted to the child node. It is related to the level of congestion LR: Load on Route, is the total communications traffic (load) from all children and their descendants that a Node sees. Thus in FIG. 4B, the LR for Root Node 000 will be all nodes connected to it, directly on indirectly. This information is needed to determine if a particular parent can support the communication needs (load) of a new child node CC Load Capacity is the amount of communication traffic or load that the node is capable of handling. It will be driven by the buffer size of the node—since data from a node's children is typically buffered before being retransmitted to the node's parent.

LC Load from Children: This is the sum total of all traffic being passed on from children to their parent for retransmission to the parent's parent. In FIG. 4B Node 002 has load from children 005, 001, 008. Each of those nodes may have children with their loads.

LL Local Load: In addition to servicing children, each node may also be servicing individual clients that comprise their local load. For example, Node 002 services three child nodes. But in addition, there could be laptops in its vicinity that connect to it directly. They constitute a local load.

Figure 2:
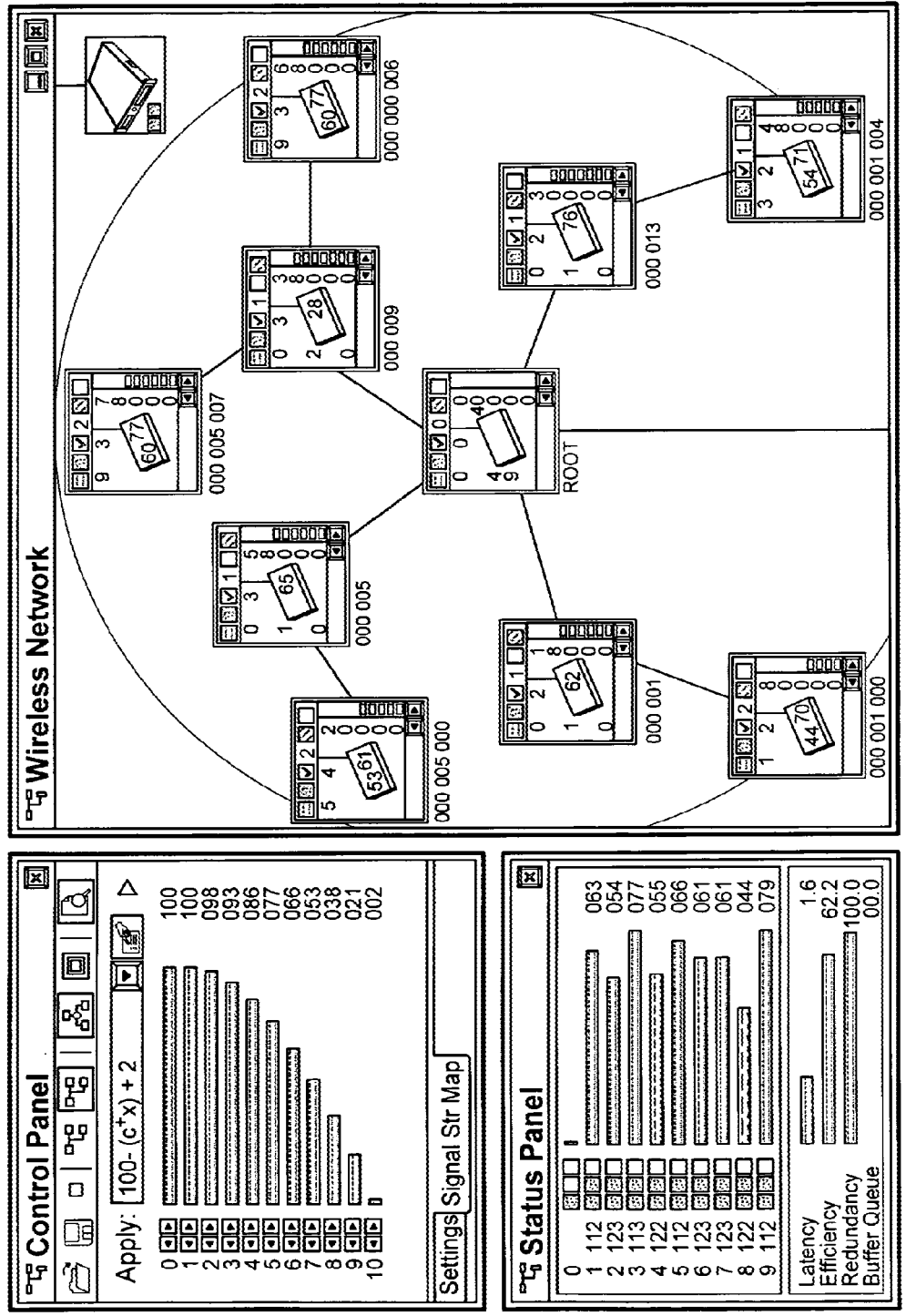
FIG. 2 illustrates a wireless network with improved throughput but poor latency according to an embodiment of the present invention.

LS Local Signal Strength: is related to signal strength that a node sees from its parent. It is actually the throughput expected based on the actual signal strength seen by the radio and is computed based on a look up table as shown in FIGS. 1 and 2.

GT Global Throughput: This is the product of all throughputs each node along the route provides. Nodes connected to the root have a throughput related to LS. Thus the throughput of Node 002 in FIG. 4B is 79%, based on the throughput table shown in FIGS. 1 and 2 and its distance from the root.

The Global Throughput of Node 005 is ($LS$ to Node 002)*($GT$ of Node 002)=0.79*70=0.55

Description of Parent Selection Algorithm

Since there is no central point of control in a distributed system, the same algorithms, running in every node, must determine what is best, based on the information it received from the Access Server and other nearby nodes. Much of this relates to selecting correct "route" or path to the root node. As an illustration, in FIG. 4B the route for Node 005 is 000-002-005. The Node 002 is the parent for Node 005 while Node 000 is the parent for 002.

Assuming for the present, that the Access Server wishes the network to have the maximum throughput. Then, if each node independently makes the best selection of its parent—to maximize throughput—then a question arises of whether one can be assured that the network as a whole is running as "best" as possible, To answer this, consider the network in FIG. 4B. If the parameter set by the Access Server is to maximize throughput. Node 002 would examine all nodes it can connect to and choose a parent that ensures the highest global throughput (GT).

Since GT is product function of the LS times the GT of the potential node. Node 005 would have examined all potential parent nodes before selecting node 002. Similarly Node 002 has chosen Node 000. Other nodes would yield a lower GT. Thus, since each node is making a parent selection based on the "best" throughput, the throughput of the network as a whole is also maximized.

Thus, each node, starting from those closest to the root and spreading outwards maximizes its GT based on products related to the GT at each previous node, the overall throughput of the system is the sum of all individual throughputs, which have been maximized by the selection algorithm.

The implementation steps taken by the selection algorithm are:

1. Seek out and list all active nearby nodes.
2. Remove descendants: nodes that are connected to it, or children of nodes connected to it.
3. Order the list: push nodes closer to the route (shorter routing paths) up in the list.
4. Compute total throughput for each routing in the list of connection nodes
5. Select the node that provides the best latency or max throughput or combination of both.
6. Repeat steps 1,5 on a periodic basis.

To compute throughput, Nodes receive the following pieces of information from all nearby nodes:

1) The current routing path of the node. This is a list of nodes that the AP node has to connect to, in order to reach a root node. In FIG. 4B, Node 005 has a routing path of 000-002-005.

2) The current throughput of that node. The signal strength of that node's parent as seen by the node, is correlated to a look up table that maps the signal strength to throughput. For Node 002 (FIG. 4B), that is shown as 79.

Figure 5:
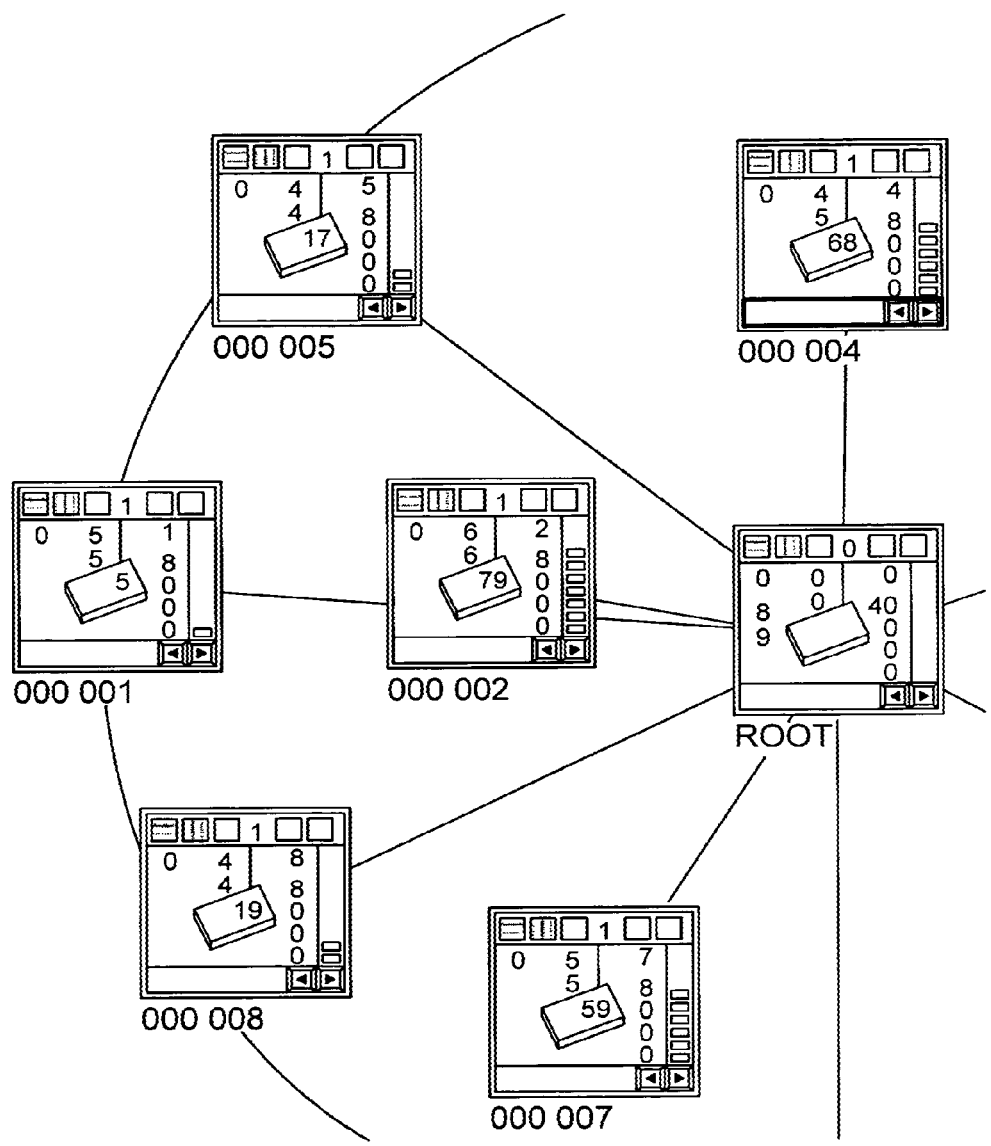
FIG. 5 illustrates Routing paths selected for low latency according to an embodiment of the present invention.

Based on these two pieces of information, collected for all nearby AP nodes, the node selects one parent node that satisfies the requirements of low latency or high throughput. If low latency is the issue then a short routing path is desirable: In FIG. 5 Node 005 chooses the root node 000. Note that the overall throughput for Node 005 is low—17% because of the large distance away from the root node, resulting in poor signal strength. Conversely, if high throughput were required, Node 005 would connect to Node 002. The overall throughput for that connection is:

Throughput (Node 002–Node 000)*Throughput (Node 005–Node 002): 0.79*0.70=0.55.

At the end of step 4, the global throughput—computed as a product of the local signal strength to that potential parent node and the GT of the potential parent node—is computed and compared for each potential parent in the list of nearby nodes. The one with the highest throughput wins.

Controlling Network Latency/Throughput

Figure 3:
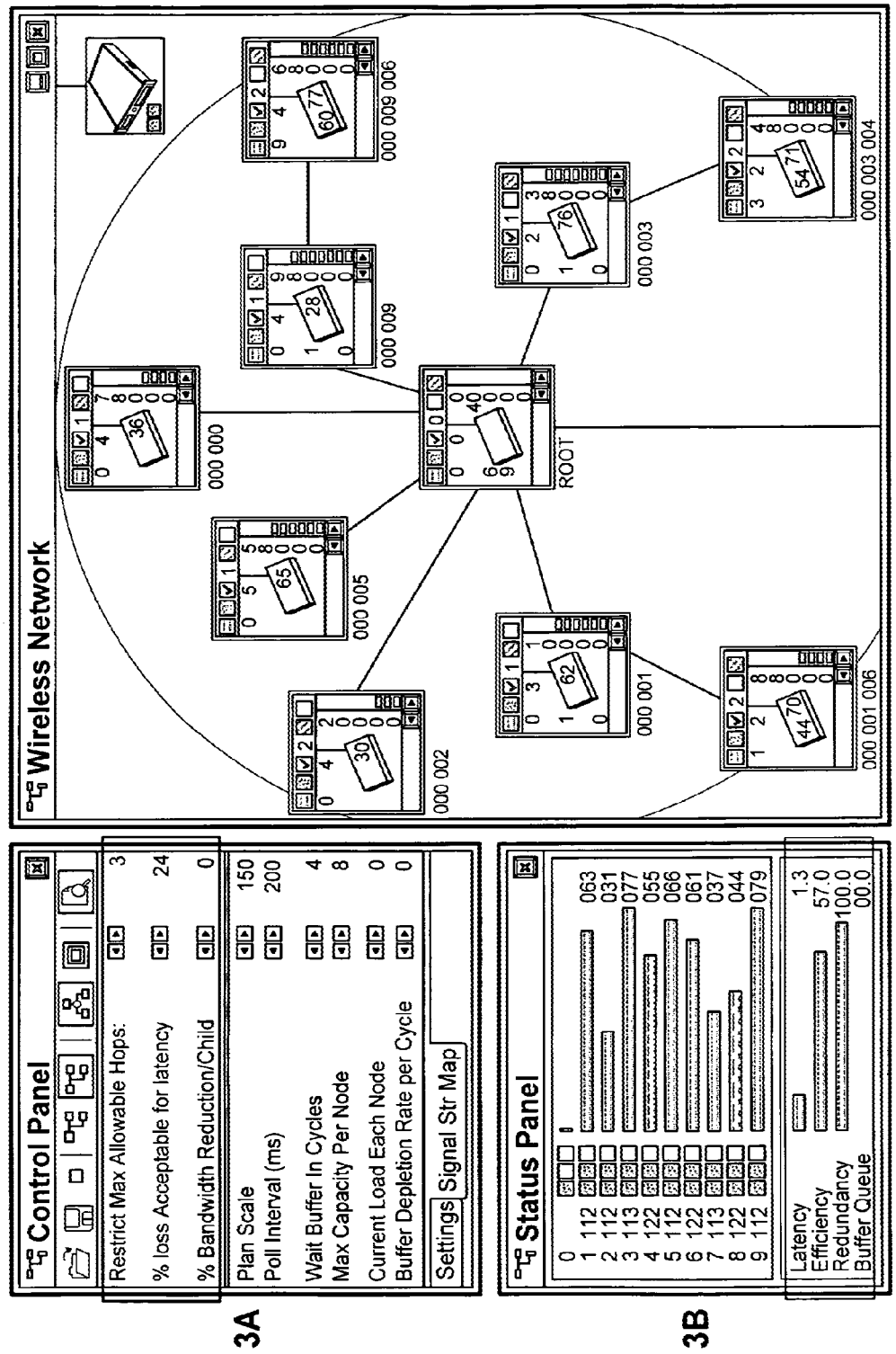
FIG. 3 shows the result of how wireless network self configures to meet Access Server requirements according to an embodiment of the present invention.

The section on the selection of the parent assumed that only maximizing throughput was the sole objective. Often there is a tradeoff between low latency and high throughput as evidenced in FIGS. 1, 2, and 3. Since each AP node is in all likelihood supporting, multiple applications with diverse needs, the access server setting is probably not either extreme but something between low latency and max throughput.

The aforementioned describes the algorithm for maximized throughput. For lowest latency, the choice of parent is restricted to the parent with the highest throughput with an upper bound on the number of hops the parent is away from the root. There are two ways in which the Access Server can control the latency of the network:

1. Place an upper hound on the number of hops admissible for any node—this forces nodes on the fringe of the network to choose shorter path routes. This approach acts a cut of it forces nodes at the fringe of the network towards selecting low latency routes, regardless of the loss in throughput. In terms of the routing algorithm, this translates to computing the throughput for selecting a parent with the highest throughput that fall in a group with latency better or equal to the upper bound.

2. Define a latency loss threshold whereby selecting a longer route path requires throughput gain to more than offset the loss of latency:

Throughput (Longer Route)+ Latency_loss_threshold>Throughput (Shorter route)

If the latency loss threshold is set high, the choices a node in selecting its parent is restricted, to nodes closer to the root, with shorter route paths. In contrast to the cutoff approach this approach is more forgiving: Selecting a longer path is allowed if throughput gains in choosing a longer routing path offset increased latency. In terms of the routing algorithm, this translates to computing the throughput for all nearby nodes.

Reference is now made to re-examining the parent selection process with latency restrictions in place. With reference to FIG. 4B, if the latency restriction of the first type is enforced, and the maximum number of hops allowed for any node is set to 1, then the list of accessible nodes is reduced to node 000. Alternatively, or in conjunction with this restriction, if the latency threshold is set high, then even if other nodes are acceptable potential parents, the latency threshold will reduce their attractiveness and again Node 000 could be selected.

Figure 6:
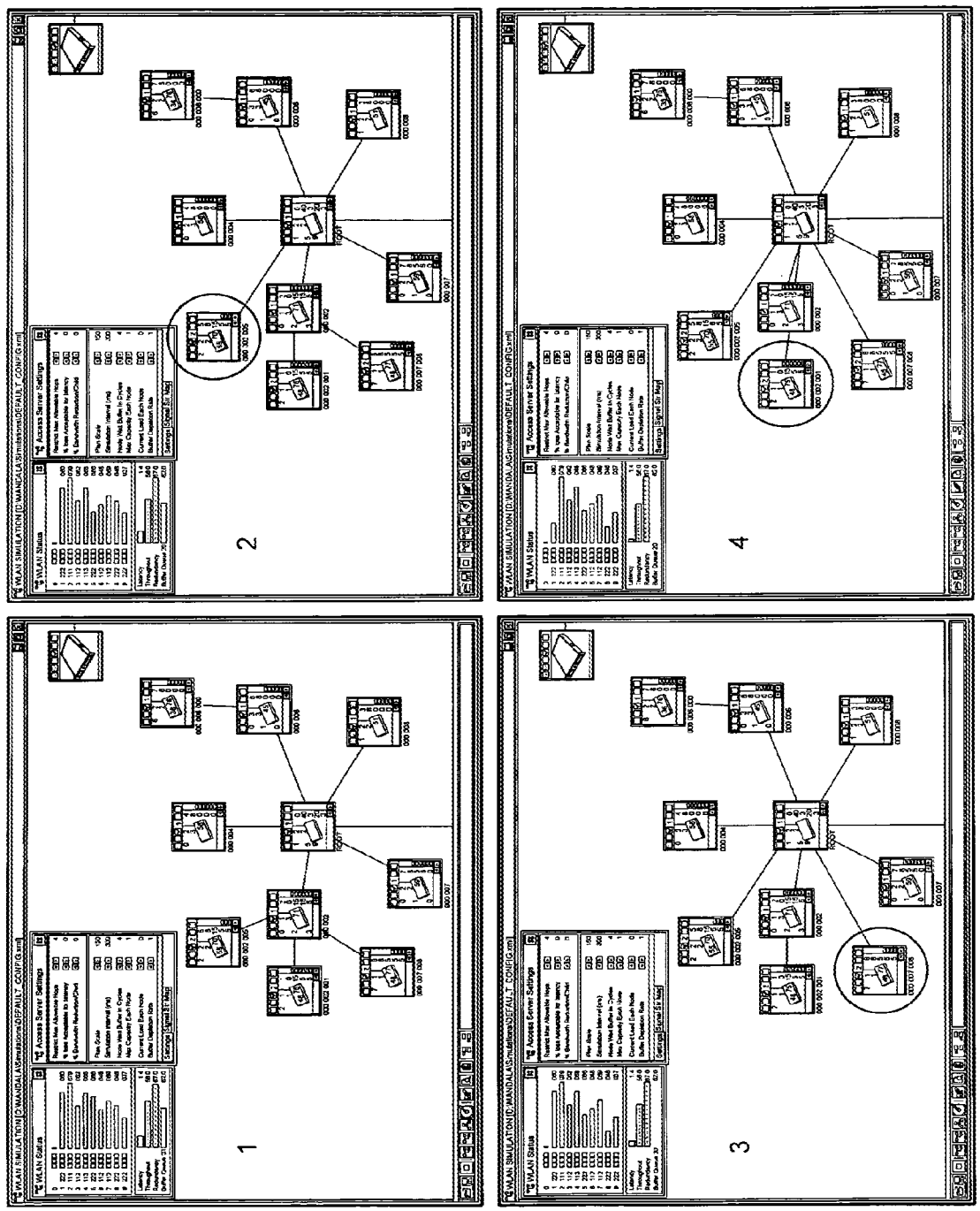
FIG. 6 illustrates how progressively changing the latency cost factor affects the network configuration according to an embodiment of the present invention.

Combinations of both restrictions, based on the parameters set, result in networks that, address both latency and throughput requirements. This was shown in FIG. 3, where the overall network configuration was somewhat mid way the two extremes. It is further evidenced in FIG. 6, where increasing the latency loss threshold results in progressively lower latency network configurations. Nodes circled in each snap shot of the simulation show movement towards shorter routing paths as the latency cost factor is progressively increased.

Automatic Load Balancing

Described thus far is how the parent selection process takes into account latency/throughput criteria set by the access server. However, one must also take into account how the system behaves under load, when the load increases at one node, causing congestion.

Since this is a distributed system, each node is responsible for selecting a parent that can service it satisfactorily—it is not part of a congested route. During the selection process, the connect cost associated with selecting a new parent is supplied by the parent. Thus a congested route will have a higher connect cost than a less congested route—and a lower throughput. The routing algorithm selects the parent with the highest throughput. As its connect cost increases a congested parent is increasing less attractive.

Figure 7:
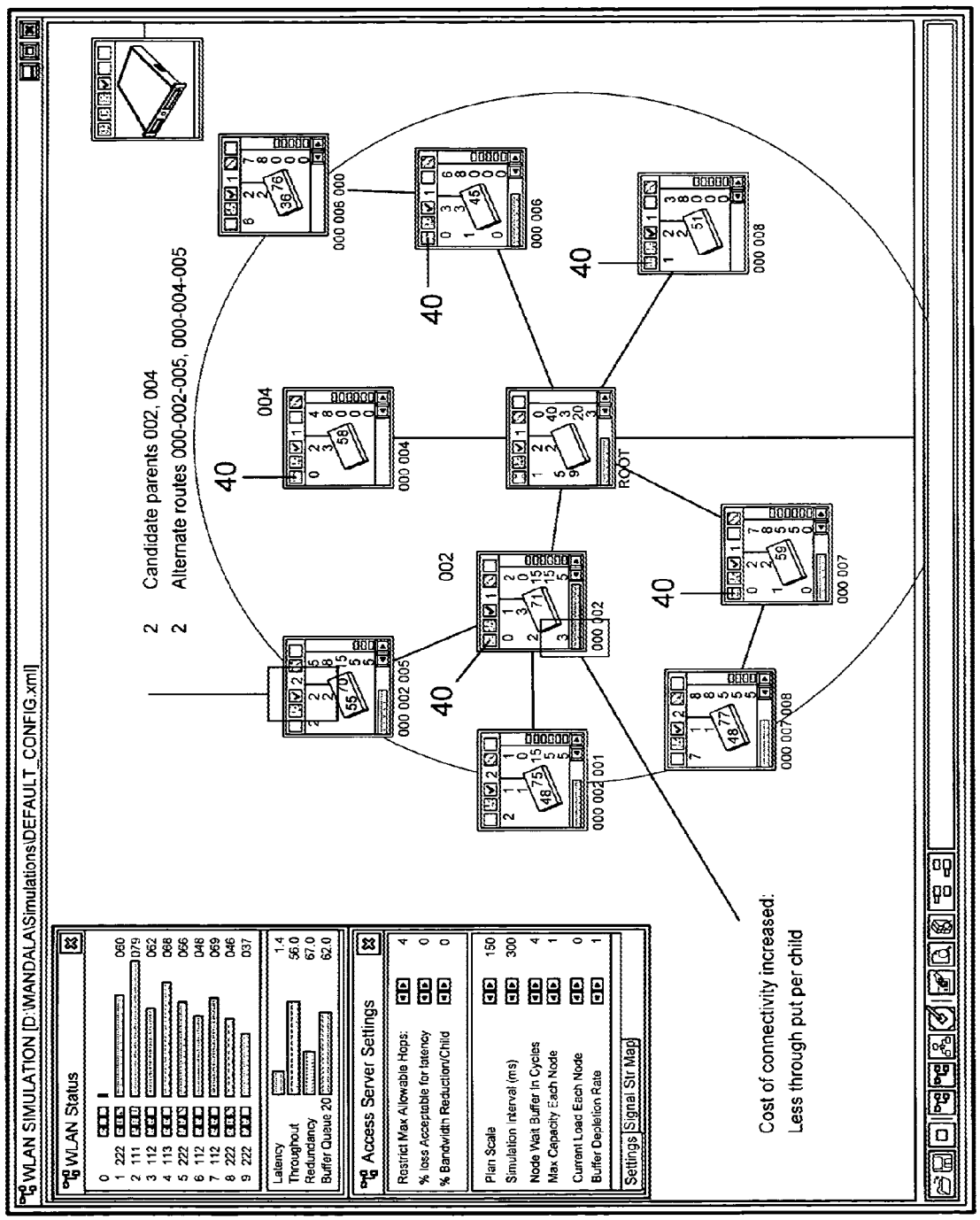
FIG. 7 illustrates how node increases its Cost of connectivity from 0 to 3 to reduce congestion according to an embodiment of the present invention.

In FIG. 7, the cost of connectivity is raised from 0 to 3, resulting in one node "leaving" in favor of a better route. As the cost of connectivity is progressively increased, more nodes select alternate paths as evidenced in FIG. 8.

Increasing the cost of connectivity acts as an incentive for nodes to find other routes, but does not prevent a child node from continuing its association. This ensures that all child nodes are serviced always. Additionally, the cost of connectivity is increased only until all child nodes that have the option to leave have left—for example, in FIG. 7, the cost in increased only while child nodes that have multiple alternate route are still attached to a congested parent node. In other words, there is no reason to increase the connectivity cost for child nodes that have no alternate route and are "stuck" with the current congested parent node.

As the load is balanced, the congestion is reduced and the cost of connectivity is gradually reduced, enabling the child nodes that left to return. If this is not done, then nodes leaving one parent would contribute to congestion elsewhere, resulting in increased cost of connectivity elsewhere and system instability.

One characteristic of a mesh network is the ability for nodes to select alternate routes, in case one node fails or becomes congested. As shown in FIG. 7, each node, when computing, the throughput of nearby nodes, also infers from the routing path for those nodes, how many alternate paths are available to it. This is done by examining the routing paths of each nearby node and classifying them based on the node that connects to the root.

In FIG. 7, Nodes 002 and 004 connect to the root—as do other nodes shown in one embodiment with a color indicated square on their top left corner (40), for instance this may be a blue square. Node 005, therefore, can have two routing paths: 000-002-005 and 000-004-005. Other nodes may also have multiple paths, but may not find a parent that, if it accepts them as child, has the capacity to service them, based on their current load. Hence, some of the nodes show one parent and one route, in another color indicator, for instance red (50).

It is desirable to configure the network to ensure all nodes have alternate paths. This is achieved by increasing the number of nodes connecting to the root. The access server can force this by increasing the latency cost factor, resulting in nodes that can connect to the root directly to do so rather than through another node closer to them to the root. This was described earlier as depicted in FIGS. 4, 5, and 6. It can also force some nodes to work in either low latency or high throughput modes—in FIG. 7, the check box for each node (checked in each case) depicts that each node is currently in high throughput mode, working within the constraints set by the access server.

By controlling the latency cost factor, or the upper bound of the max hops, the access server can change the configuration of the network resulting in a higher redundancy of the system and less likelihood of load congestion hot spots.

Real World Constraints to Load Balancing Algorithm

Implementation of the load balancing algorithm on the wireless devices, required modifications to the connect cost algorithms based on real world constraints. Wireless devices communicating with devices running the load balancing software may not all be running the same software. As an example, consider the case where the load balancing software is loaded on wireless Access Points but not on laptops communicating with the access points. Clearly, the laptop has no way of knowing that the connect cost has increased and therefore will continue to "stick" to the access point The load balancing algorithm has therefore been modified to work where there is no communication regarding connect cost by the following approach: When the load exceeds a out off threshold, the Access Point (or other wireless device performing load balancing) will drop its signal strength to the lowest possible—thereby dissuading clients such as laptops from associating with it and encouraging them to seek another association with a higher signal strength access point.

Since the laptops seek the access point with the highest signal strength, this is a necessary hut not sufficient cause for a re-association: some laptops may continue to "stick" to the access point, due to proximity or a sticky algorithm. The Access Point must therefore forcibly disassociate the laptop.

After disassociating all the stations that it needed to, in order to shed load, the access point can gradually increase its signal strength to attract back some the stations that it disassociated. Those that did not find other associations, will return, almost immediately after association, and the access point takes them back because despite the lowered signal strength, these devices have no place to go.

This load balancing algorithm has been implemented and demonstrated to shed load by moving one laptop from one root node to another when overloaded by two laptops on the same root node.

Monitoring the Health of the Network

By controlling the latency cost factor, or the upper bound of the max hops, the access server can change the configuration of the network resulting in a higher redundancy of the system and less likelihood of load congestion hot spots. In FIG. 7, Node 002 is shown congested and available "parents" that will accept it are reduced to 1 (shown in red (50)).

As a result the redundancy and fail safe nature of the wireless network has been adversely affected.

Congestion in FIG. 7 is being caused by the fact that there is only one root node transporting all wireless traffic to the wired network. Clearly, another root node would improve the fail safe nature of the network.

Algorithms have been implemented that reside in the device and periodically check to see what potential associations are possible. If the number is reduced to one then a warning (shown in red) is forwarded to the Network Management System. The system administrator is then advised to add another root node to preserve the fail safe nature of the network. Note that this type of warning is coming from the edge device to the management system and without the algorithm in place, the management system would not know that a problem existed Dynamic Channel Allocation and RF Interference Control Managing the throughput of voice, video and data traffic in a wireless network is complicated by the nature of the wireless medium. Since wireless is a shared medium, all traffic can potentially interfere with other traffic on the same radio channel—at any point in time only one device can be active on any one given channel. This limits the bandwidth in cases where high bandwidth traffic (e.g. video) needs to be transported or when there are many devices on the network.

One solution is to allocate different channels to devices communicating on different portions of the network. For example, in FIG. 10, each of the 3 sub networks shown in Red (70), Black (80) and Blue (90) circles can communicate on one channel internally and another channel externally through the parent—that is part of the other BSS.

Figure 16:
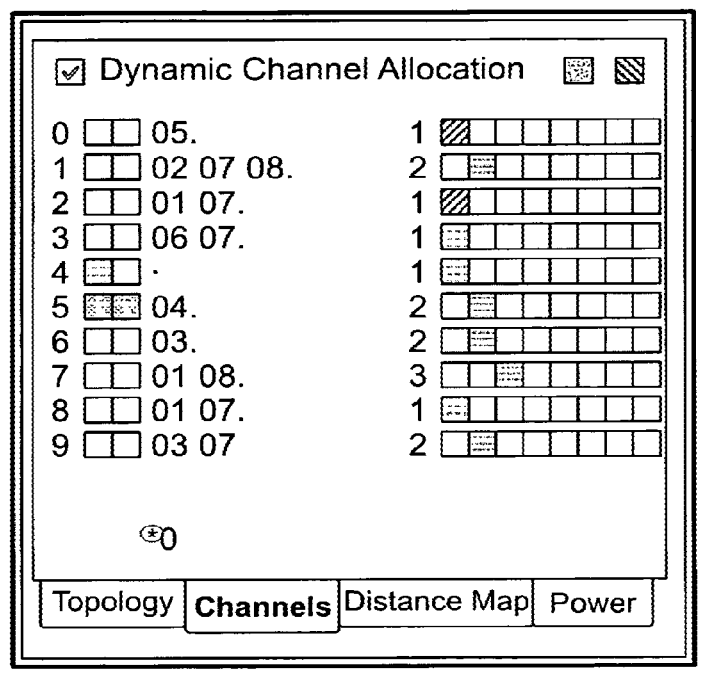
FIG. 16 illustrates an implementation of a Dynamic Channel Allocation Scheme to ensure non-interfering radio channel selection (enlargement) according to an embodiment of the present invention.
Figure 17:
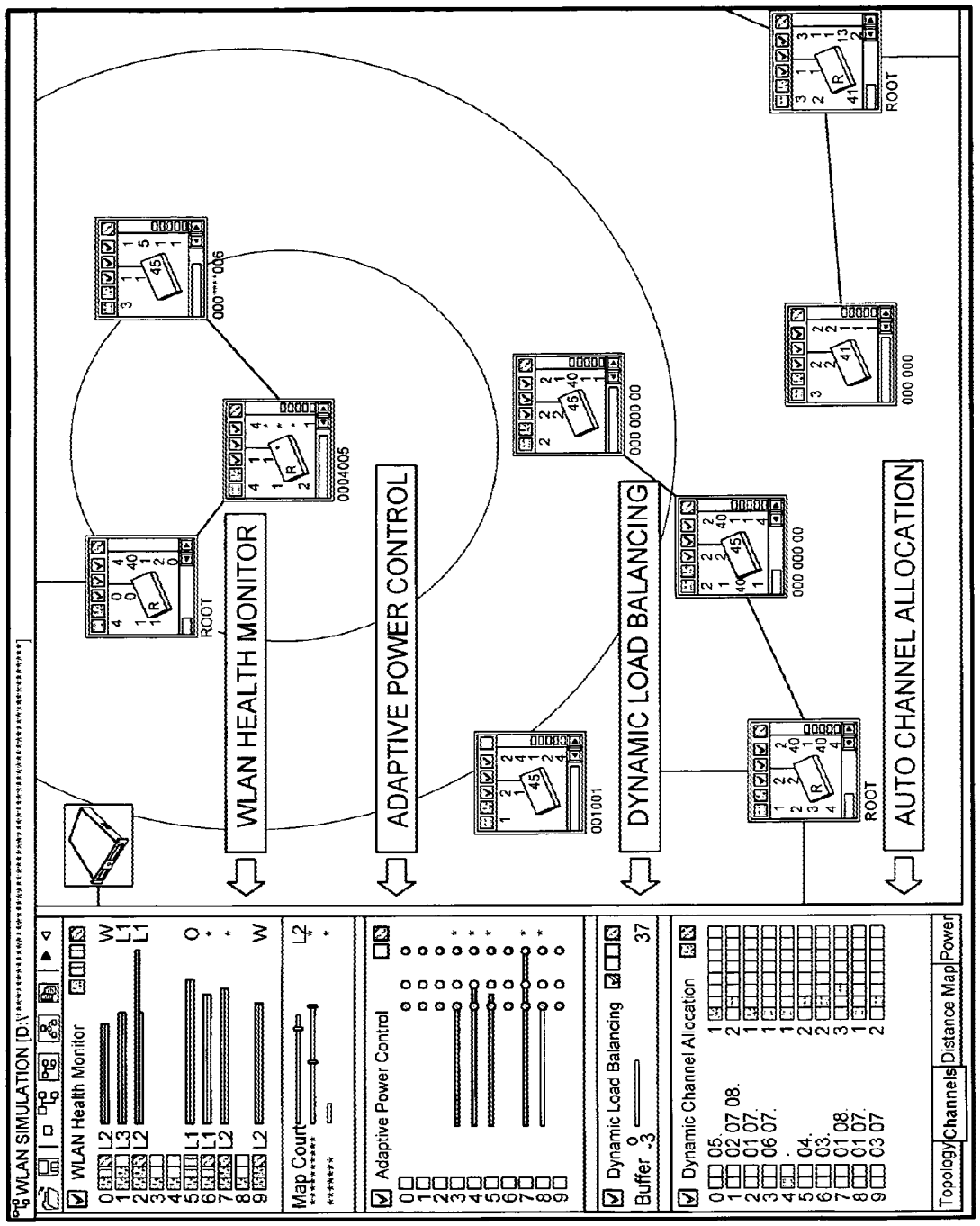
FIG. 17 illustrates an implementation of a Dynamic Channel Allocation Scheme to ensure non-interfering radio channel selection according to an embodiment of the present invention.
Figure 18:
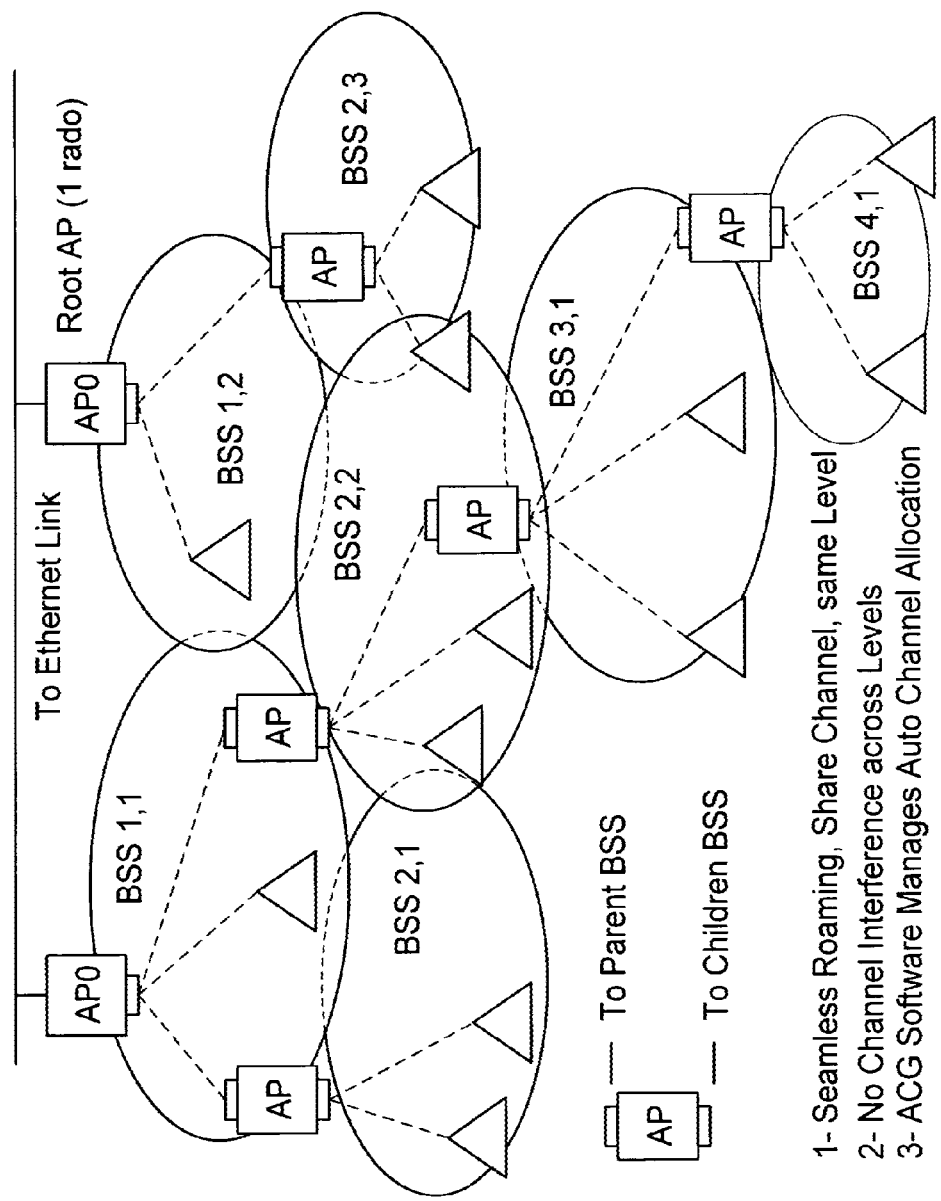
FIG. 18 illustrates an implementation of a Dynamic Channel Allocation Scheme to ensure seamless roaming in a multi hop mesh network according to an embodiment of the present invention.
Figure 6:
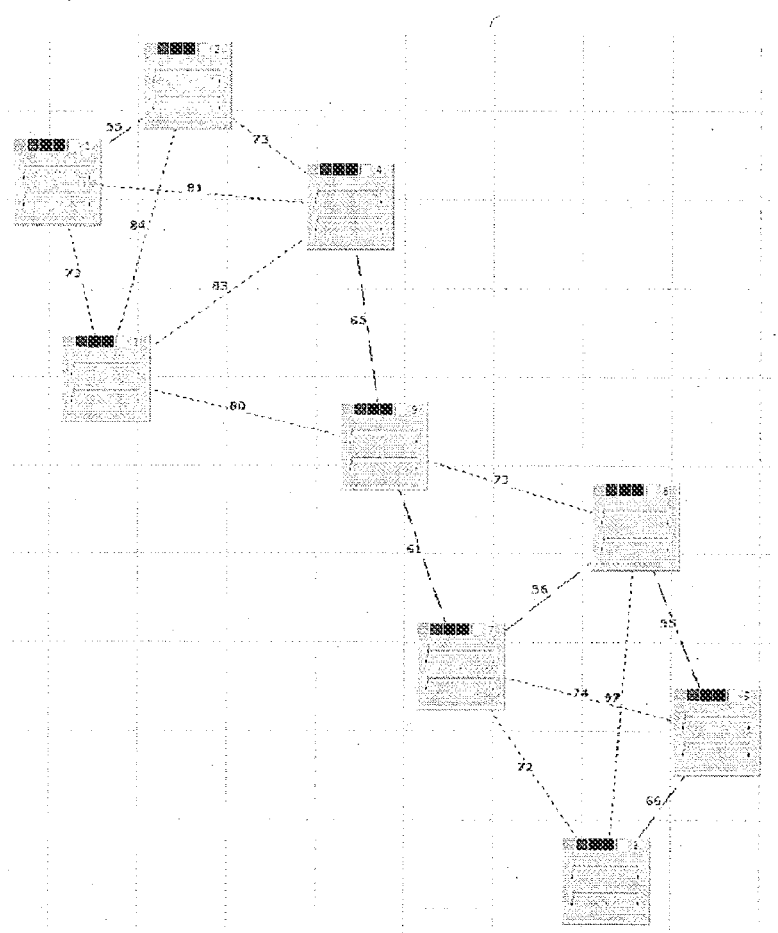

An algorithm to define what the best channel allocations should be between devices and their parents has been devised and shown in FIG. 16 and in FIG. 17. The algorithm sends out a beacon on all channels to inform all neighboring devices that it is intending to select a channel. All neighboring devices—that can hear the beacon—respond over the wired network with the channel numbers they are using. The algorithm then takes care to select a channel, from a list of available channels that does not conflict with channels selected by neighboring devices Dynamic Channel Allocation and Seamless Roaming Requirements A situation can occur when, as shown in FIG. 18, some overlap between neighboring channels is called for. One reason for this is seamless roaming where a laptop leaves one wireless area and enters another adjoining area. If the signal strengths are managed, so that the overlap between adjoining areas is minimized, then adjoining areas can share the same RF channel and yet cause a reduction in bandwidth. Further, devices moving from one region to another will do so without having to change channels, which is time consuming and hence disruptive.

The algorithm implemented addresses the case where siblings of a multi layered wireless network are to be assigned the same channels. In FIG. 18 BSS [1,1] and [1,2] share the same channel for access by their client stations. Also BSS [2,1], [2,2], [2,3] also share the same channels for seamless roaming by their client stations. The implementation of the algorithm therefore requires that when one sibling makes a channel assignment, ALL adjoining siblings have to make the same channel assignment. The channel selection process therefore requires a list of all neighboring nodes for all siblings and their RF channels. This extension has been incorporated into the channel allocation algorithm.

Protocols for sharing this information have been implemented and tested. Appendix A hereto describes the 802.11 Infrastructure Control Layer Protocol version 2.0. In addition, Appendix B hereto describes in another embodiment of the present invention, a distributed adaptive control algorithm for ad-hoc wireless personal area networks.

Note that seamless roaming requires that the Wireless AP shown in FIG. 18 have incorporated the features needed for switching—that is auto discovery of new clients in its BSS. Else messages being sent to a new client (previously connected to another BSS) will not be forwarded to the client, now part of the another BSS. The wireless equivalent of a wired switch has been implemented and is covered in a subsequent section.

Asynchronous Application Data Flow

Algorithms that show how data from nodes will flow to the root node have been modeled for both high throughput and for low latency requirements. High throughput data flow requirements are discussed first.

To service asynchronous applications each node services its children in a round robin manner, ensuring that all children are serviced in sequence. But to ensure that all children receive at least one service request, each recently serviced child must wait for at least another child to be serviced before it can be serviced again. Additionally, some child nodes servicing applications with higher priority will be serviced before others.

In one implementation of this algorithm, related to this invention, the priorities may be stored in the Access server and different applications fall into different priority buckets. By changing the priorities in the Access Server, applications with higher priority are serviced before other competing applications with a lower priority. Also with a priority bucket, applications with more data to transfer are serviced first.

In another implementation, the determination regarding which child to service next is based on which child needs servicing the most. This is determined by examining the load of each child, each time; the node services its children. It is done each time because:

Child nodes may have made other connections, if load balancing is also active

Child nodes data may have changed—data with short time to live, will have been removed The node then makes the decision to service the child with the highest need, in a priority bucket, provided it has not serviced that same child most recently. This is simply to avoid any one child from "hogging" all the attention.

Figure 9:
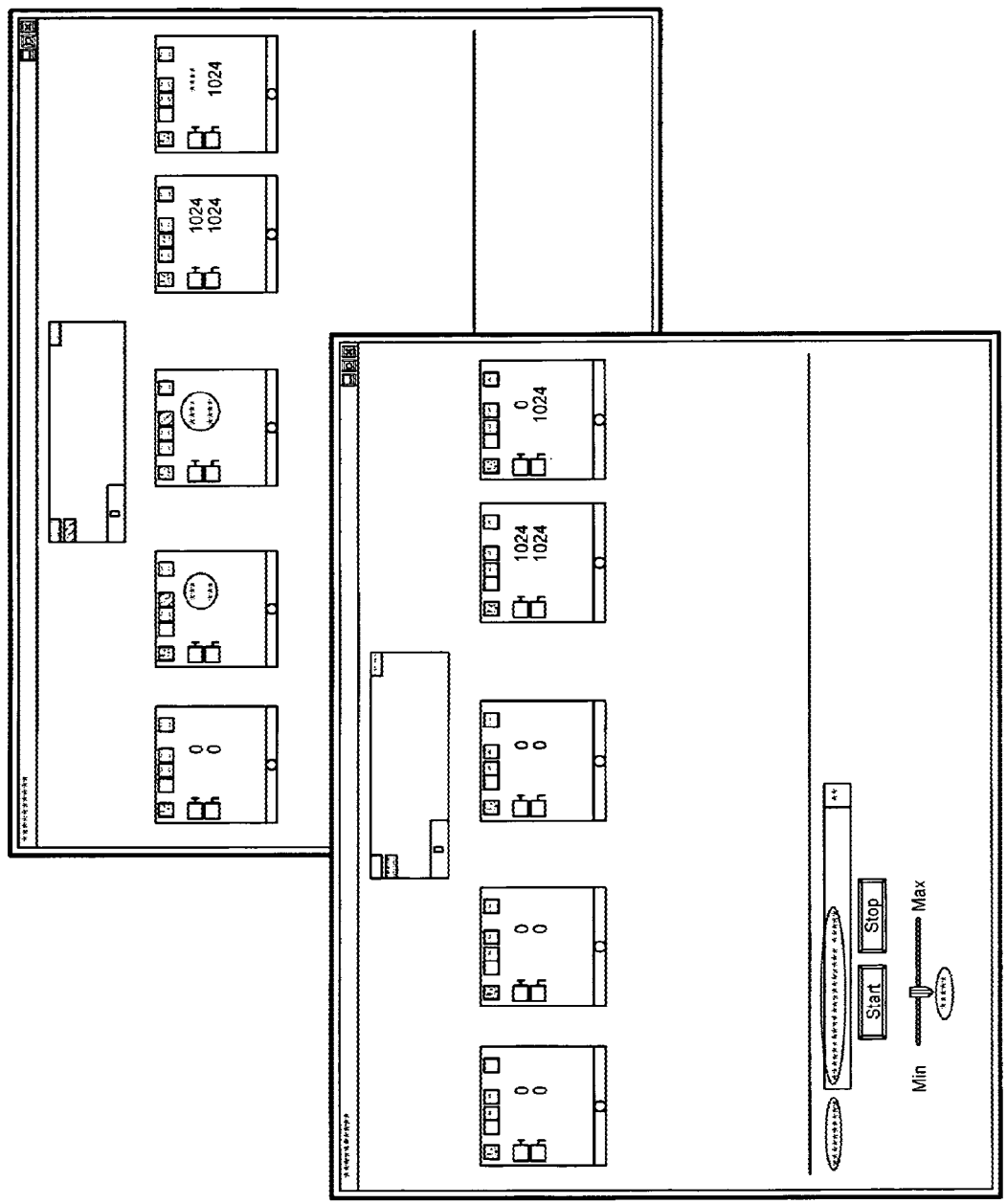
FIG. 9 shows the modeling of both the DCF and PCF algorithms described, based on 802.11X specifications according to an embodiment of the present invention.

This proprietary PCF (Point Control Function) implementation worked well for asynchronous applications, when compared to 802.11a standard DCF (Distributed Control Function) approach that was also implemented for benchmarking reasons as shown in FIG. 9. The PCF protocol implemented per the approach described above was approximately twice as fast, largely because nodes did not have to deal with delays caused by collision avoidance contention window delays required for wireless transmissions in a DCF mode.

Isochronous Application Data Flow

Isochronous applications require more deterministic service intervals that are less sensitive to variations of load. The algorithm described above is not suitable when:

Each child must be serviced by the parent in a regular and predictable time interval The amount of data transferred is relatively fixed—else it will affect the time interval.

Figure 10:
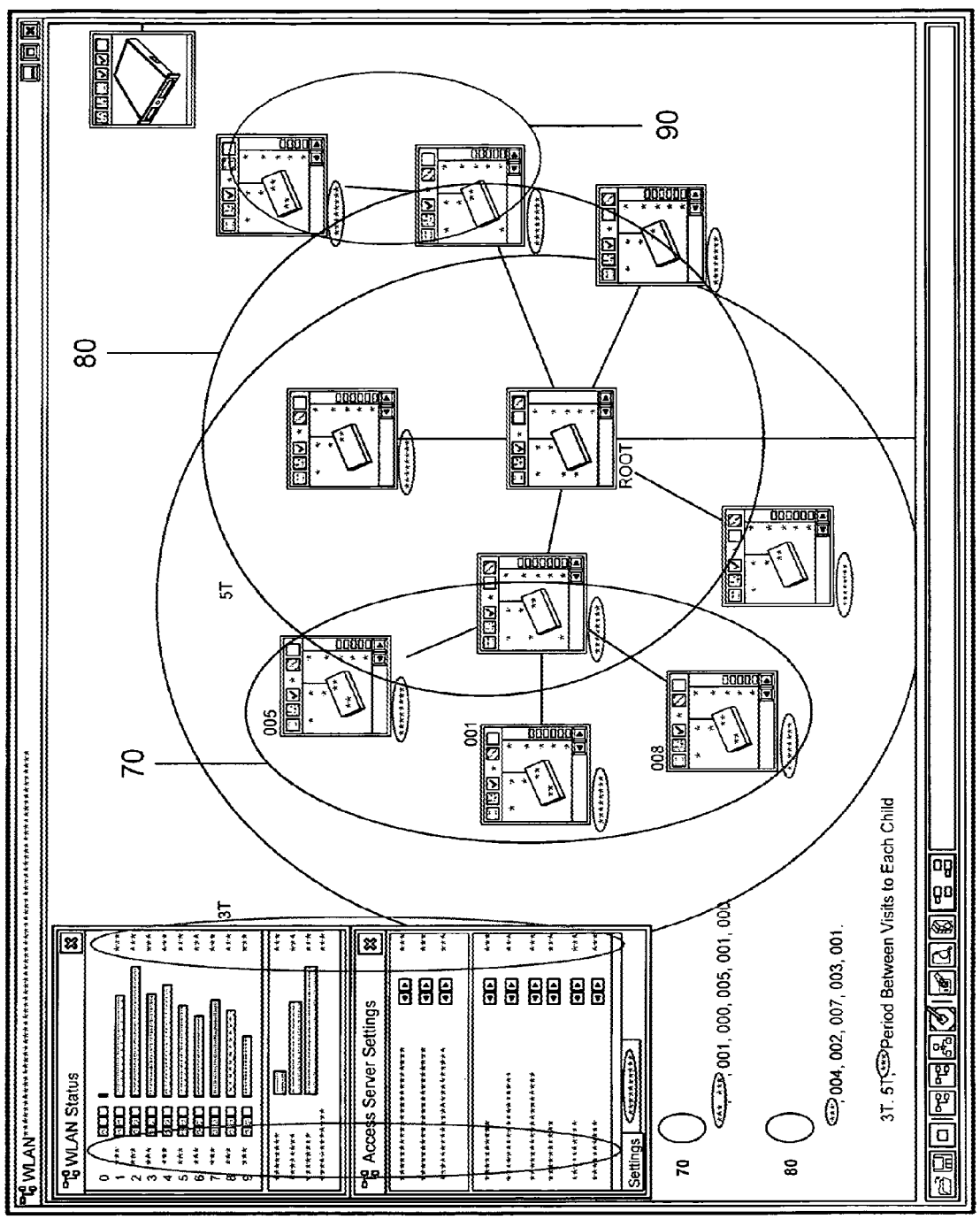
FIG. 10 illustrates how the worst timing constraint for an isochronous PCF mode would be 5 T according to an embodiment of the present invention.
Figure 11:
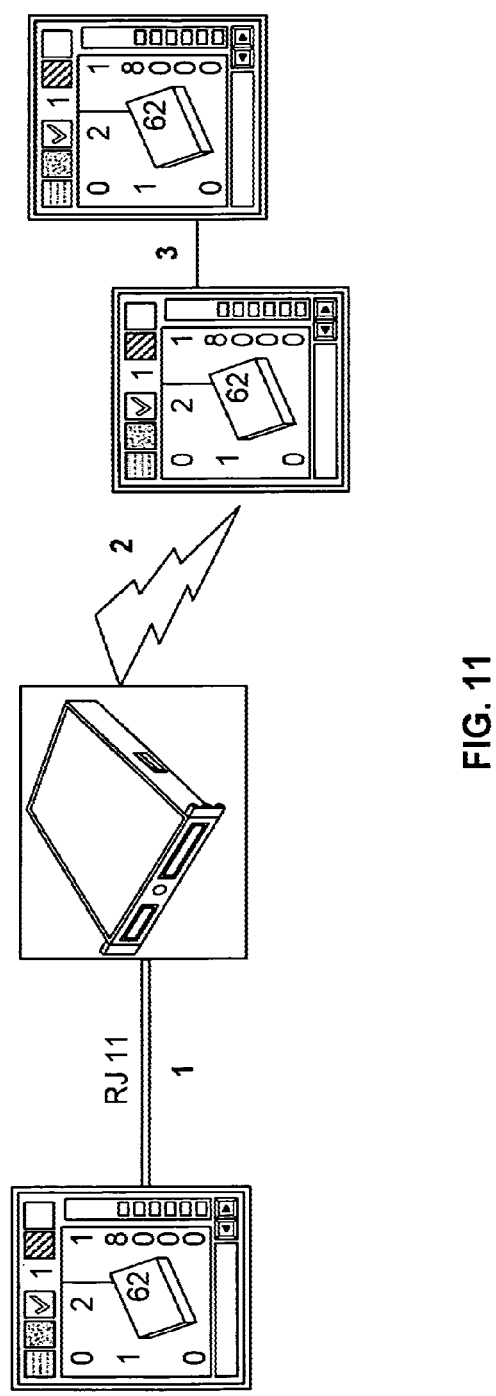
FIG. 11 shows the Key distribution for AES symmetric private key distribution under PKI for distribution according to an embodiment of the present invention.

The algorithm to service Isochronous Application has also been implemented. In FIG. 10, there are two service cycles. One service cycle (70) services 3 children, the other one (80) 5 children, one of which is the parent node of the three children in the first service cycle (70). In each service cycle, each child is visited at a regular interval defined by 1) the time interval between each switching from one child to another and 2) the number of children in each service cycle.

Thus if the parent of the red service cycle (70) spends 10 ms with each child, it will revisit each child every 3*10=30 ms. Data from each child cannot then be retrieved at a rate faster than once every 30 ms.

Having retrieved the data, it will sit at the buffer of the parent, until the parent is serviced (the black (80) circle). Since there are 5 children in that service cycle, the service period is 5*10=50 ms.

Since both service cycles are running independently of each other with no synchronization, it is impossible to predict when the parent in either service cycle will service its children. It can be stated, however that each child in service cycle marked red (70) (005, 001, 008) will have data transferred to the root at best every 30 ms and at worst every 50 ms. In other words, in the isochronous network, the worst time interval is the maximum time period of all service cycles.

If it is assumed that, to ensure multiple routing paths, there are more nodes connected to the root, then the service cycle will be driven by the number of 1 hop nodes, in this case 5. Note that the network configuration is set for high throughput. In this configuration the worst service cycle is 5 T. Ironically, the network configuration for a "low latency". Isochronous network would have been 9 T, will all nodes connected to the root. In other words, in the case of isochronous networks, the algorithm proposed provides a better service cycle and a better throughput. In general, splitting the number of nodes into two or more service cycles will improve the service cycle. The high throughput mode setting for the routing algorithm makes that happen naturally.

Internal Traffic Flow/Wireless Equivalent of Switching

Referring again to FIG. 10, Nodes 005, 001, 008 are children of Node 002. The red oval (70) indicates that these form a "family". In the technical parlance of 802.11, they are a "Basic Service Set" (BSS). Likewise the nodes in the black circle (80) form another family or BSS.

Traffic from Node 005 to Node 001 would logically travel to Parent 002 and then from 002 to 001. This affects the throughput of the entire system because the traffic is buffered in 002 and then retransmitted. If node 005 was aware of its siblings, within its wireless range, then Node 005 and Node 001 could communicate directly over wireless. In effect this would be a wireless equivalent of Ethernet switches.

This direct communication link between siblings (within range) increases throughput 100%. This is so because 2 transfers of data (Source node to parent and then Parent to destination node) are now reduced to 1 transfer (Source node to destination node).

In this embodiment, the algorithm has been implemented whereby traffic intended for a destination node is automatically sent to the destination node if it is within the family/

BSS and within range. When the routing algorithm runs, the routing paths of each nearby node is recorded to determine the number of hops it is away from the root. From the routing paths, the list of siblings within range can be inferred—they all share the same parent in their routing paths. If data intended for these siblings is received, it will automatically be sent to the sibling, without involving the parent.

If the destination node is not in the list of nearby siblings, then the data has to be sent onwards to the parent node. At that point the parent node, which "knows" its siblings, can route traffic to one if its siblings. Thus the switching algorithm ensures that traffic is routed only as far as a parent whose child is a destination node.

Extensions with Multiple Radios

As shown in FIG. 10, there are at least two families or BSS in the network. Node 002 belongs to both—as a parent of one (the red oval BSS) (70) and as a child to another (the black circle BSS) (80). To communicate with its children, Node 002 has one radio, and another to communicate with its parent. There is preferably therefore, at the minimum, two radios in each node for the system to work—One radio to support the inward interface (the children, red oval (70)) and one to support the outward interface (the parent, black circle (80)).

Adding more radios to the outward interface increases throughput but also enables more freedom in making choices related to latency/throughput tradeoffs. For example, suppose that some traffic requires high throughput and other traffic low latency. If the compromise approach described in this invention is unacceptable because the range of requirements are too high, then two radios for the outward interface can reduce the range of requirements: One radio will address more of the low latency traffic with a low latency traffic route while the other will address the high throughput needs with a different high throughput traffic route. The wireless node now begins to resemble a wireless equivalent of network routers.

The algorithms described in this invention are still applicable: only the range of applicability has changed. The embodiment of the present invention is also relevant for wireless routers.

Security of the Network

Wireless transmissions are inherently insecure. While the technology to encrypt/decrypt secure data exists, the problem is communication of the keys over wireless to the nodes, from the access server. This common key distribution problem is addressed by the following embodiment of the system.

The wireless communication devices will have, as part of the algorithms resident in their operating system, the ability to generate a public and private key based on the RSA algorithm. These keys will be based on some unique identifier in the AP node—the processor Chip Serial Number as an example.

When the Wireless device is first deployed, it will be connected via Ethernet cable to the access server and the node's public key will be transmitted to the Access Server. This public key will be used by the Access Server to transmit a common private key (using the symmetric AES encryption algorithm) to all nodes. Since only the Access Server knows the public key for each node, only the access server will be able to transmit this private key. Further, since the common private key for all nodes was transmitted in encrypted form to all nodes, it is impossible to decipher the common private key without knowing the public key for the node it was intended for. In addition, even if that public key for that node is known, it is useless since the private key for that node was never exchanged. The transmission of the common Private Key is thus secure.

Secure data transmitted by one AP node will then be encrypted with the common private key and be decrypted only at a destination AP node. By the same token, all data from the Ethernet to an AP node will be encrypted with the same private key for onward transmission.

The enterprise Access Server can be used to generate a new private key at regular intervals and transmit it to all Wireless AP Nodes in the system. The system is thus doubly secure.

Implementation of Algorithm in Firmware

The control algorithms described above require significant resources—CPU Memory—resulting in large footprint applications. Wireless devices and other network aware communication devices are typically embedded systems with low foot print requirements. A challenge that must be addressed—if this technology is to have practical applications is how to reduce the footprint of the software control layer to fit into embedded devices with 64 KB or 128 KB RAM.

Figure 15:
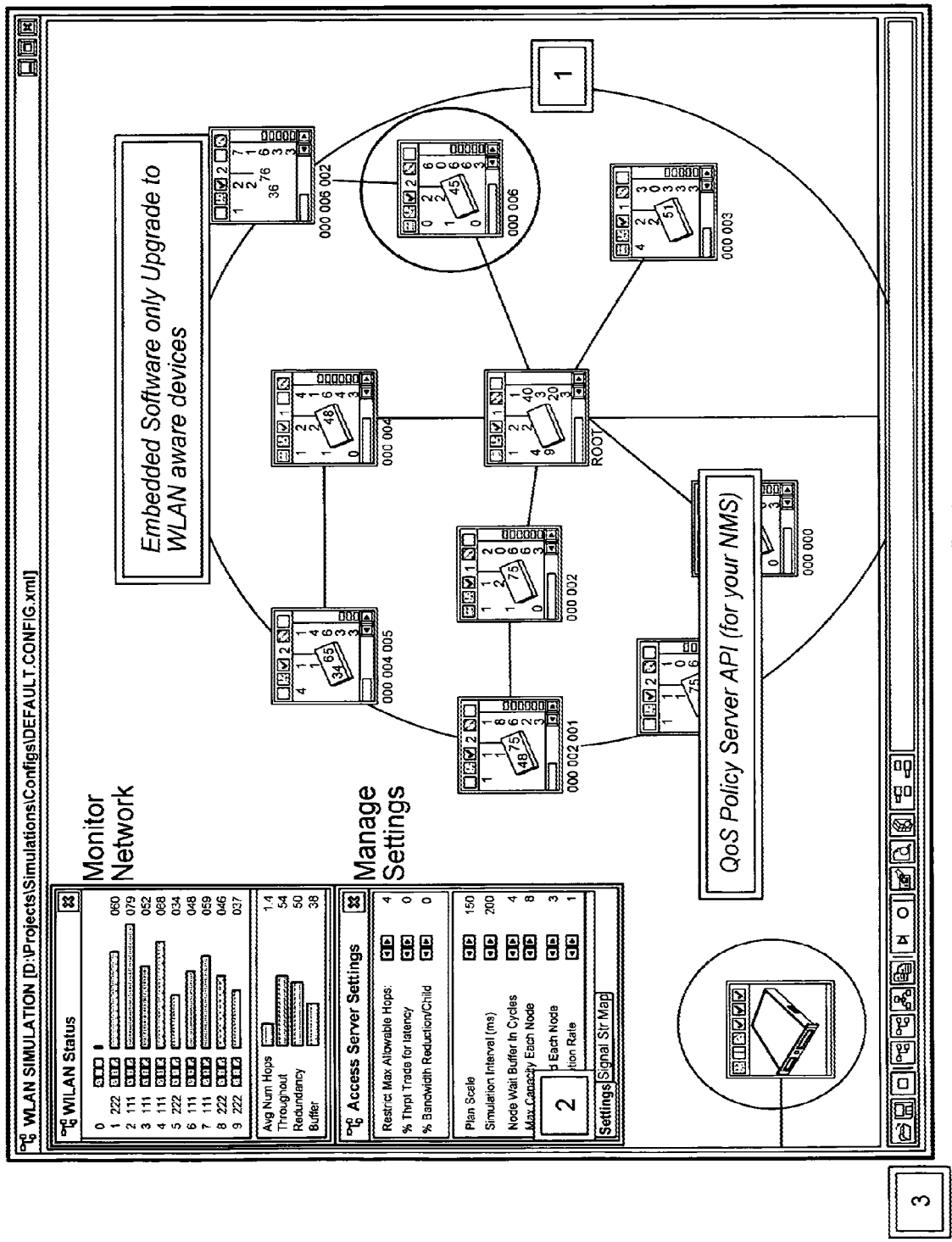
FIG. 15 illustrates an implementation of a complete system including three components of one product offering, according to an embodiment of the present invention.

A self-standing executable containing some of the algorithms and support functions has been produced within a footprint of less than 100 KB running on an Intel PXA250 Processor. Additionally in an embodiment of the present invention, the mesh and load balancing algorithms have been successfully ported to run on the hardware depicted in FIG. 15, with a footprint of 64 KB.

The reason for the small footprint is that the approach of the embodiment of the present invention to building software is to include only the portions of an operating system needed by the programs. Thus, only functional blocks needed by the algorithms are added to the make file needed by the compiler to create the executable. If string functions are not required by any procedures in the program, then the string function library is not included when the executable is made. In contrast, a typical embedded operating system is more general purpose, requiring a larger footprint and possibly more CPU resources.

The language in which the algorithms are written is currently Java, and will may also include Microsoft™.NET languages. In the embodiment of the present invention, a Java Class file converter has been built that takes Java Byte Code and disassembles it to produce what is referred to internally as R (for Real) classes. R classes are the C code equivalent of the Java Op codes, used by a Java Virtual Machine (JVM) to run the Java program. The R classes map to C code which is produced after examining the functional libraries needed and adding them to the list of support libraries needed to make an executable self standing. Once that is completed a self-standing executable is made for the processor.

An extensible service library of software components needed to build complete Operating system (OS) is implemented through the embodiment of the present invention. This component based approach to building an Operating system from scratch enables one to select only the essential services needed by an application when it is ported from high level languages to small footprint embedded devices. Since only the essential services and not an entire general purpose OS is included, the footprint is compact. Additionally, there is a significant (3×-6×) performance improvement because layers of software needed to run code written in high level languages like Java or .NET languages are no longer needed.

Figure 13:
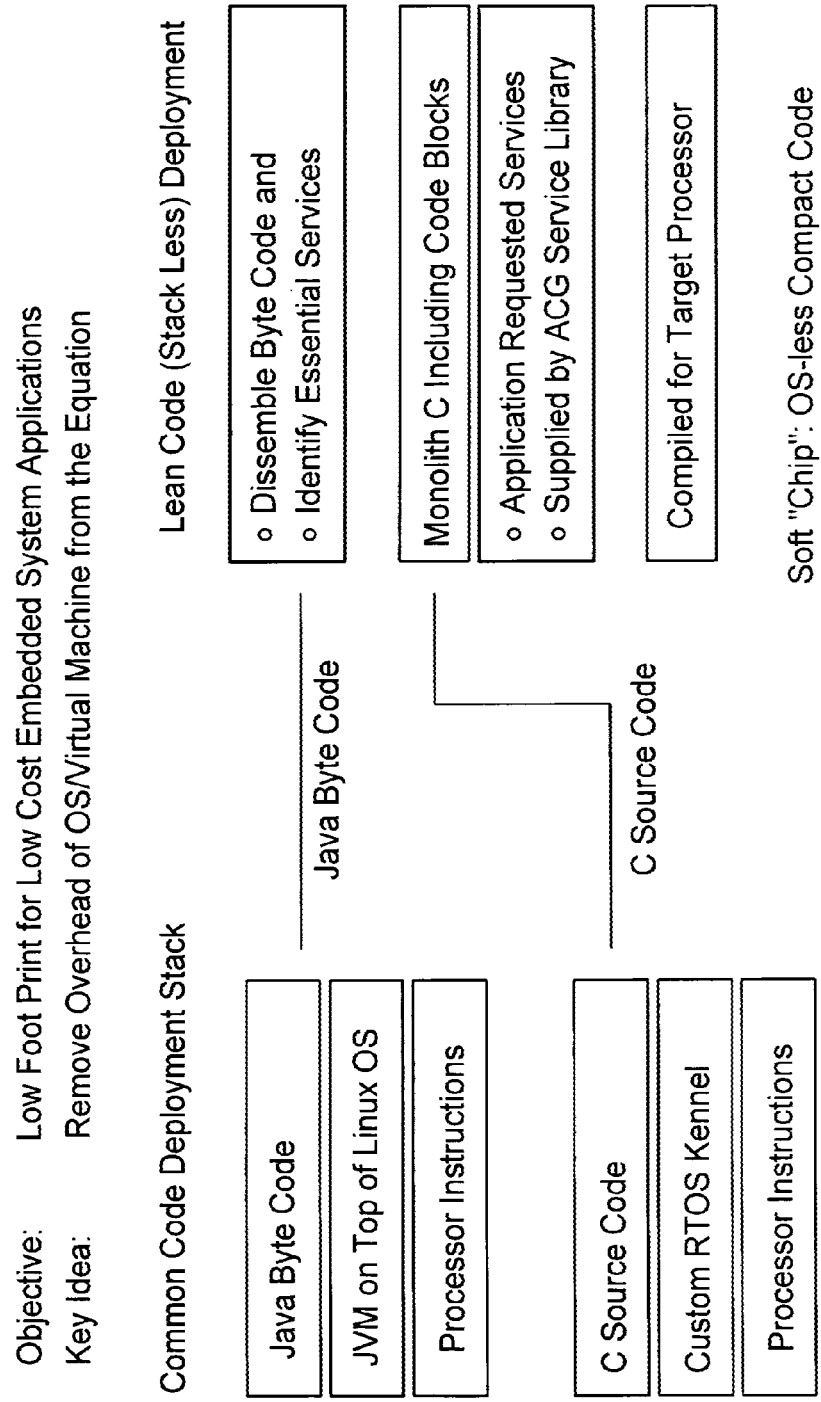
FIG. 13 illustrates the process for low footprint code generation from Java or C, with ACG RTOS library components according to an embodiment of the present invention.

FIG. 13 depicts how the approach of the embodiment of the present invention to lean code generation differs from more traditional approaches. On the left of the figure are the layers or stacks needed to run Java (JVM on top of linux) or C (on top of a custom RTOS OS like VxWorks). On the right is an embodiment where Java code is examined at the Byte code level to identify essential services. These services are added when the Java Byte code is converted to C—by mapping Java Op codes intended for a ATM to code blocks from a library of C equivalent code blocks. For C code, this means simply adding the OS service code blocks needed for the C program to run without an RTOS below it. In both cases, as depicted in FIG. 13, A monolith block C code is produced, much like a Compiler would, except that all the services are statically bound at development time and no dynamic bindings are required at run time, as is the case with the layered approach on the left.

Thus there is a clear migration strategy in place from high level code generation to low level object code that includes all the functionality provided by an operating system to ensure that the object code is self contained.

Figure 14:
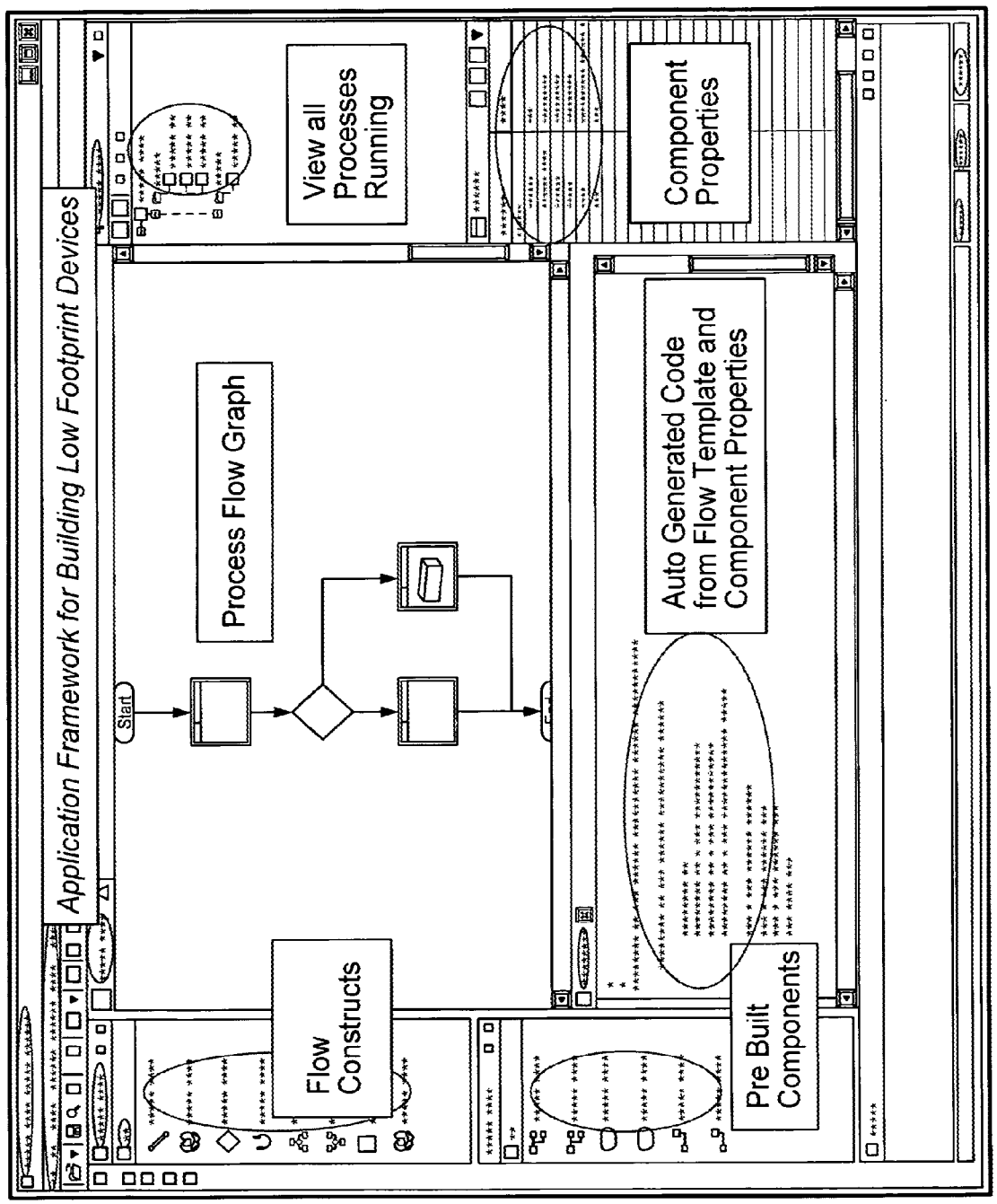
FIG. 14 illustrates the implementation of a method to generate low footprint code from Java according to an embodiment of the present invention.

There is implemented one version of this migration strategy where one begins with high level code written and tested in a development environment and can swiftly ingrate it to a low footprint executable. FIG. 14, depicts an extension to IBM's open extensible framework for development, called Eclipse (www.eclipse.org). As shown, there is built a framework on top of eclipse that enables one to model processes as a flow graph, where at each node of the flow graph one can insert code that needs to be tested. The framework is also used to do a performance analysis of code blocks at each node to determine where the bottlenecks are. At the end of the debug and analysis cycle, Java Byte Code is passed on to the Byte code converter (shown in FIG. 13) for low footprint code generation.

Since there is no OS, there is no easy way to tamper with the system. This approach—internally referred to as Application Specific Embedded OS software—thereby protects the security of the algorithms and enables the algorithms to run on low power (and less expensive) processors and with lower (and less expensive) memory requirements.

Figure 12:
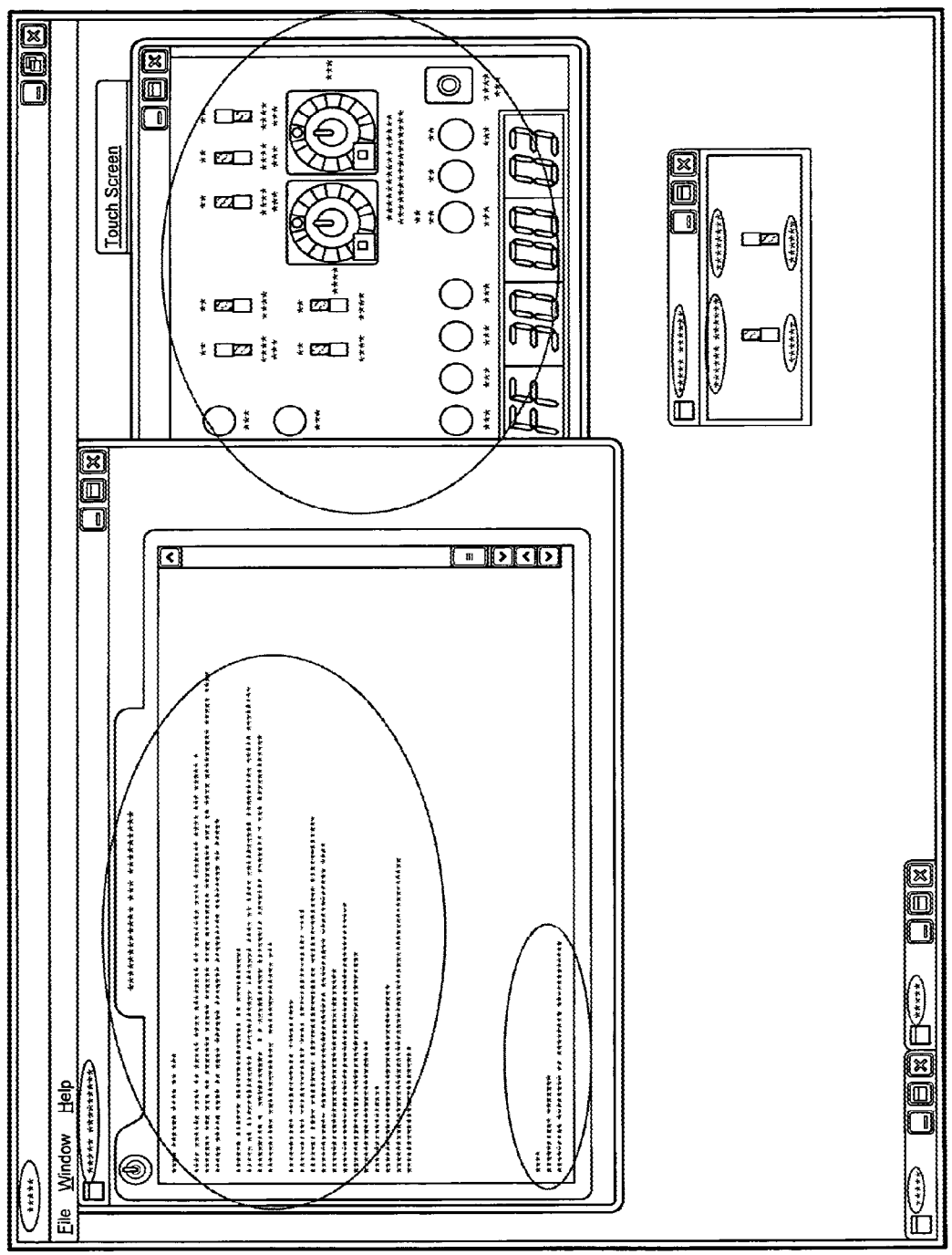
FIG. 12 illustrates ACG RTOS running algorithms in Intel PXA250 emulation environment according to an embodiment of the present invention.

The simulations depicted are running the same code in each node shown in the figures. The code running in each node has been compiled to object code for the Intel™ PX250 processor as a proof of concept (FIG. 12). It has also been compiled to run on a embedded system development platform shown in FIG. 15.

Upgrade Path for New Algorithms

A distributed network poses problems related to upgrading the software at each node. If the software is cast in concrete—as in an ASIC implementation—then there is no upgrade path available. Since the wireless standards are evolving, this is not a practical approach.

In the description of the embodiment of the modular approach to generating a self standing executable, it becomes apparent that there is no migration path available to the system to upgrade the executable easy.

This is resolved by providing a simple communication protocol for uploading new object code into the system. This has also been implemented as is internally called Simple Upgrade Protocol (SUP).

When the executable is made, a simple communication protocol is added, which, with proper authentication, using the public key of the node, can be used upload object code into the Hash memory of the device. A very thin boot kernel with the AP Node and the rest of the code is remotely installed. The boot kernel contains the simple communications protocol to upload object code and the security to ensure that only the Access Server can access the device. By building security at the hoot level, one ensures that all code, loaded into the system has to be authorized—since the security code cannot be overwritten.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

APPENDIX A

EXEMPLARY 802.11 INFRASTRUCTURE CONTROL LAYER PROTOCOL VERSION 2.0

DESIGN CONSIDERATIONS

Size Limitation

Since an Ethernet packet can only be a maximum of 1500 bytes the maximum length of a UDP datagram so as to not cause IP fragmentation is 1472 (1500 - 20 byte IP header - 8 byte UDP header). Every SNIP packet consists of a 8 byte SNIP header followed by parameters. Since all IMCP functions use only 1 SNIP parameter the maximum length of the parameter value is therefore 1462 (1472 - 8 byte SNIP header - 2 byte param length).

Packet Destination

All SNIP packets (either from Access Manager or from A/P) are sent via UDP to either the limited broadcast (FF:FF:FF:FF:FF:FF) or a chosen multicast address (01:00:5E:XX:XX:XX).

This method ensures that all A/P's get the message and also obviates the need for assigning I/P addresses to every A/P.

DEFINITIONS

Network Health Monitoring

Health Index

The number of unique Root paths determines the Health Index of an Access Point. In an "All-Root" network the Health Index determines the degree of redundancy of the Access Point's location. In an infrastructure mesh network for Relay nodes the Health Index determines the number of unique paths to the "wire"

Heartbeat Interval

This attribute specifies the interval at which Access Points send in a "heartbeat" signal, that specifies the conditions of their operations.

Location Awareness Scan Interval

This attribute specifies the interval, at which Access Points scan the "airspace" to know about other Access Points in their vicinity, to determine their Health Index and for Dynamic Load Balancing purposes.

Dynamic Load Balancing

This Boolean attribute, determines whether an Access Point enables the adaptive dynamic load balancing functionality during its operation. If enabled the Kick-in Threshold and Delta T attributes determines the way this functionality is put to use.

Connect Cost

The Connect Cost is a value in the range [0,3] where 0 being the minimum Connect Cost. The Access Point increases its cost of connectivity during Dynamic Load Balancing, after it determines that the load has stayed beyond the Kick-in Threshold for a period of Delta T units. The Connect Cost is adaptively reduced according to the load.

Delta T

This attribute determines the duration of sampling for the Access Point to determine that the load was higher or lower than the Kick-in threshold for Dynamic Load Balancing purposes.

Kick-in Threshold

This attribute is a percentage of the total capacity of the Access Point. This is used in conjunction with Delta T for Dynamic Load Balancing purposes.

Dynamic Channel Allocation

Channel Number

When Dynamic Channel Allocation is disabled, this attribute specifies the channel of operation for the Access Point.

Topology

Latency Throughput Control

When zero, this instructs the Access Point to always choose a Parent, whose hop count is lowest. When non-zero, the Access Point may choose to "tradeoff" latency for throughput provided the difference in throughput is more than Latency/Throughput Trade-Off attribute.

Max Allowable Hops

This attribute controls the topology of the wireless network so that, any Access Point is never more than Max Allowable Hops away from the "wire".

Latency/Throughput Trade-off

This attribute determines, the difference threshold for an Access Point to choose a parent with more number of hops in exchange for lower latency.

PACKET INFORMATION

STA Association Notification

| | |
|---|---|
| Direction | *AP to Broadcast/Multicast* |
| When Sent | *Upon STA association* |
| SNIP FUNCTION ID | 3 |
| Purpose | Topology Updating |

Param 0 Value Format

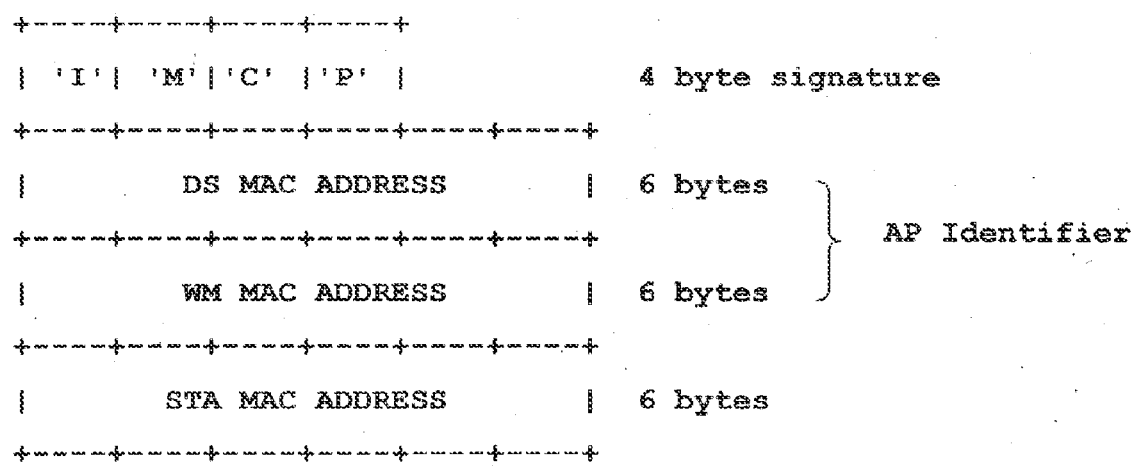

Total Size

22 Octets

STA Disassociation Notification

Direction　　　　　　　　*AP to Broadcast/Multicast*
When Sent　　　　　　　 *Upon STA disassociation*
SNIP FUNCTION ID　　　  4
Purpose　　　　　　　　 *Topology Updating*

Param 0 Value Format

```
+-----+-----+-----+-----+
| 'I' | 'M' | 'C' | 'P' |              4 byte signature
+-----+-----+-----+-----+-----+-----+
|           DS MAC ADDRESS        |   6 bytes  ⎫
+-----+-----+-----+-----+-----+-----+            ⎬  AP Identifier
|           WM MAC ADDRESS        |   6 bytes  ⎭
+-----+-----+-----+-----+-----+-----+
|           STA MAC ADDRESS       |   6 bytes
+-----+-----+-----+-----+-----+-----+
|  REASON  |                          2 bytes
+----------+
```

Total Size

24 Octets

Access Point IMCP Synchronization

Direction                      *AP to AP*

When Sent                  *When an AP starts up or during scanning*

SNIP FUNCTION ID       11

Purpose                       Identification, Health, Topology

Param 0 Value Format

```
+----+----+----+----+
|'I' |'M' |'C' |'P' |           4 byte signature
+----+----+----+----+----+----+
|                              |
|           BSSID              |  6 bytes
|                              |
+----+----+----+----+----+----+
```

Total Size

10 Octets

Access Point IMCP Acknowledgement

Direction                      *AP to AP*

When Sent                  *Upon receipt of IMCP Sync*

SNIP FUNCTION ID       12

Purpose                       Identification, Health, Topology

Param 0 Value Format

```
+----+----+----+----+
|'I' |'M' |'C' |'P' |           4 byte signature
+----+----+----+----+----+----+
|                              |
|           BSSID              |  6 bytes
|                              |
+----+----+----+----+----+----+
|                              |
|        ROOT BSSID            |  6 bytes
|                              |
+----+----+----+----+----+----+
```

Total Size

16 Octets

Seek Best Parent Request

| | |
|---|---|
| Direction | *AP to Access Server* |
| When Sent | *Upon startup and frequently* |
| SNIP FUNCTION ID | 13 |
| Purpose | Topology Formation, Operation |

Param 0 Value Format

```
+----+----+----+----+
|'I'|'M'|'C'|'P' |              4 byte signature
+----+----+----+----+
|      DS MAC ADDRESS      |    6 bytes  ⎫
+----+----+----+----+----+----+            ⎬  AP Identifier
|      WM MAC ADDRESS      |    6 bytes  ⎭
+----+----+----+----+----+----+
| CC | PC | FR | HI | CH |       5 bytes
+----+----+----+----+----+
|         BSSID[0]         |    6 bytes
+----+----+----+----+----+----+
|S[0]|N[0]|                     2 bytes
+----+----+
|         BSSID[1]         |    6 bytes
+----+----+----+----+----+----+
|S[1]|N[1]|                     2 bytes
+----+----+

:                          :
        :                          :

+----+----+----+----+----+----+
|         BSSID[X]         |    6 bytes
+----+----+----+----+----+----+
|S[X]|N[X]|                     2 bytes
+----+----+
```

X = PC − 1

CC = CONNECT COST (0,1,2,3 with 0 being minimum)

HI = HEALTH INDEX (NUMBER OF UNIQUE ROOT PATHS)

FR = FORCE REPLY

CH = CHANNEL

PC = PARENT COUNT (ROOT NODES SET PC TO 0)

S[i] = Signal strength from Parent i

N[i] = Noise from Parent i

BSSID[i] = BSSID of Parent I

Total Size

21 + 8 * PC (MIN 21, MAX 1461)

Seek Best Parent Response

Direction                *Access Server to AP*

When Sent              *Upon receipt of SEEK request*

SNIP FUNCTION ID     14

Purpose                 *Topology Formation, Operation*

Param 0 Value Format

```
+----+----+----+----+
| 'I'| 'M'| 'C'| 'P'|                4    byte signature
+----+----+----+----+----+----+
|       DS MAC ADDRESS        |      6    bytes  ⎫
+----+----+----+----+----+----+                  ⎬  AP Identifier
|       WM MAC ADDRESS        |      6    bytes  ⎭
+----+----+----+----+----+----+
|          BSSID              |      6    bytes
+----+----+----+----+----+----+
|ENC |AUT |LTC | DLB|DCA | CH |      6    bytes
+----+----+----+----+----+----+
|DT  |MAH |LAS | ESL| KI |KTH |      6    bytes
```

```
+----+----+----+----+----+----+
| TO |SKL |NASL|HBI |              4    bytes
+----+----+----+----+----+----+
|   PRIMARY RADIUS  | AUTPRT |    6    bytes
+----+----+----+----+----+----+
|    SEC RADIUS     | ACCPRT |    6    bytes
+----+----+----+----+----+----+
|         WEP KEY 1          |   13    bytes
+----+----+----+----+----+----+
|         WEP KEY 2          |   13    bytes
+----+----+----+----+----+----+
|         WEP KEY 3          |   13    bytes
+----+----+----+----+----+----+
|         WEP KEY 4          |   13    bytes
+----+----+----+----+----+----+
|          ESSID             |  ESL    bytes
+----+----+----+----+----+----+
|        SHARED KEY          |  SKL    bytes
+----+----+----+----+----+----+
|         NAS NAME           | NASL    bytes
+----+----+----+----+----+----+
```

ENC = ENCRYPTION TYPE

AUT = AUTHENTICATION TYPE

ESL = ESSID LENGTH

KI = WEP KEY INDEX

SKL = SHARED KEY LENGTH

NASL = NAS ID LENGTH

PRIMARY RADIUS = PRIMARY 802.1X RADIUS SERVER IP ADDRESS

AUTPRT = AUTHENTICATION PORT

SECONDARY RADIUS = SECONDARY 802.1X RADIUS SERVER IP ADDRESS

ACCPRT = ACCOUNTING PORT

DLB = DYNAMIC LOAD BALANCING

DCA = DYNAMIC CHANNEL ALLOCATION

LTC = LATENCY THROUGHPUT CONTROL (0 for Lowest Latency, 1 for Tradeoff)

MAH = MAX ALLOWABLE HOPS

HBI = HEARTBEAT INTERVAL

LAS = LOCATION AWARENESS SCAN INTERVAL

CH = CHANNEL NUMBER

DT = DELTA T

KTH = DYNAMIC LOAD BALANCING KICKIN THRESHOLD

TO = LATENCY/THROUGHPUT TRADEOFF

Channel Scan Lock Request

| | |
|---|---|
| Direction | *AP to Access Server* |
| When Sent | *Before scanning* |
| SNIP FUNCTION ID | 15 |
| Purpose | Health |

Param 0 Value Format

```
+----+----+----+----+
|'I'|'M'|'C'|'P'|                4 byte signature
+----+----+----+----+
|                                 
|       DS MAC ADDRESS       |    6 bytes  ⎫
+----+----+----+----+----+----+              ⎬  AP Identifier
|       WM MAC ADDRESS       |    6 bytes  ⎭
+----+----+----+----+----+----+
```

Total Size

16 Octets

Channel Scan Lock Response

| | |
|---|---|
| Direction | *Access Server to AP* |
| When Sent | *When Access Server determines* |
| SNIP FUNCTION ID | 16 |
| Purpose | Health |

Param 0 Value Format

```
+----+----+----+----+
|'I'|'M'|'C'|'P'|              4 byte signature
+----+----+----+----+----+
|      DS MAC ADDRESS      |   6 bytes  ⎫
+----+----+----+----+----+              ⎬ AP Identifier
|      WM MAC ADDRESS      |   6 bytes  ⎭
+----+----+----+----+----+
```

Total Size

16 Octets

Channel Scan Release Lock Request

| | |
|---|---|
| Direction | *AP to Access Server* |
| When Sent | *After finishing scanning* |
| SNIP FUNCTION ID | 17 |
| Purpose | Health |

Param 0 Value Format

```
+----+----+----+----+
|'I'|'M'|'C'|'P'|              4 byte signature
+----+----+----+----+----+
|      DS MAC ADDRESS      |   6 bytes  ⎫
+----+----+----+----+----+              ⎬ AP Identifier
|      WM MAC ADDRESS      |   6 bytes  ⎭
+----+----+----+----+----+
```

Total Size

16 Octets

Channel Scan Release Lock Response

Direction            *Access Server to AP*
When Sent            *Upon receipt of Lock Release Request*
SNIP FUNCTION ID     18
Purpose              Health Param 0 Value Format

```
+----+----+----+----+
|'I'|'M'|'C'|'P' |                 4 byte signature
+----+----+----+----+----+----+
|       DS MAC ADDRESS       |    6 bytes  ⎫
+----+----+----+----+----+----+             ⎬  AP Identifier
|       WM MAC ADDRESS       |    6 bytes  ⎭
+----+----+----+----+----+----+
```

Total Size

16 Octets

Access Point Reset

Direction: *Access Server to AP*

When Sent: *When settings change*

SNIP FUNCTION ID: 19

Purpose: Operation

Param 0 Value Format

```
+----+----+----+----+
|'I' |'M' |'C' |'P' |                    4 byte signature
+----+----+----+----+----+
|      DS MAC ADDRESS    |               6 bytes  ⎫
+----+----+----+----+----+                        ⎬ AP Identifier
|      WM MAC ADDRESS    |               6 bytes  ⎭
+----+----+----+----+----+
```

Total Size

16 Octets

References

1. Simple Network Information Protocol SNIP, Sriram Dayanandan, January 2003.

APPENDIX B

DISTRIBUTED ADAPTIVE CONTROL ALGORITHM FOR AD-HOC WIRELESS PERSONAL AREA NETWORKS © 1992-2003 Advanced Cybernetics Group, Inc. All rights reserved.

TECHNOLOGY DESCRIPTION

CONVENTIONAL ROUTING PROTOCOLS

Distance-Vector Routing (DV)

Each node maintains a table of approximate distances of nodes. Nodes send the table out to nearest neighbors. The receiving nodes update their tables and recalculate routes using a shortest path algorithm. Thus routing decisions are made using sub-global approximations and are not optimal especially in a dynamically changing environment like WPANs.

Link State Routing (LS)

Each node maintains a view of the entire network and broadcasts the state of the link to its nearest neighbors. The receiving nodes update their tables and recalculate routes using a shortest path algorithm. Pros include: widely used and commercialized; well tested; well documented. Cons include: well suited for static environments, not for dynamic environments; infrastructure oriented (dedicated hosts are organized for routing); not suited for resource constrained, low power devices

STANDARD AD-HOC ROUTING ALGORITHMS

The IETF Mobile Ad-Hoc Networking Standard (MANET) has proposed the following AD-HOC routing algorithms.

Destination Sequenced Distance Vector Routing (DSDV)

- A version of DV adjusted for AD-HOC networks.
- Power management is not considered
- Does not have dynamic adaptive load balancing
- Convergence times can be large
- No support for QOS

- No zonal/multi-channel support

AD-HOC On Demand Distance Vector Routing (AODV)

- Reactive as opposed to pro-active
- Uses L3, hence is shielded from the MAC and PHY layers
- Supports only one route per destination
- Does not have dynamic adaptive load balancing
  - Power management is not considered
- Does not support unidirectional links
- No support for QOS
  - No zonal/multi-channel support

Dynamic Source Routing (DS)

- Reactive as opposed to pro-active. Routes are learnt on-demand and hence can slow down the performance
- Does not have dynamic adaptive load balancing
  - Power management is not considered
- Needs support from either the MAC layer or the network layer for including the route information
- No support for QOS
  - No zonal/multi-channel support

Zone Routing Protocol (ZRP)

- Divides the network into zones
- Intra-zone routing is left to the implementer
- Inter-zone routing uses a reactive as opposed to pro-active protocol
- Does not have dynamic adaptive load balancing
  - Power management is not considered
- No support for QOS

ALGORITHM DESIGN CONSIDERATIONS

No Central Control

AD-HOC WPAN's typically work in environments where there cannot be any level of central intelligence as far as routing and parametric decisions are concerned. This requires the algorithm to be truly distributed and every device must be able to make decisions by itself.

Self-configuring

AD-HOC WPAN's by definition need to be self-configuring without having the need for any network plan.

Self-healing/Fault Tolerant

AD-HOC WPAN's need to be self-corrective and fault tolerant. Devices must be able to change their routing decisions in real-time as soon as a path gets clogged or closes down.

Dynamic Adaptive Load Balancing

The load on the network must be balanced fairly across all possible paths, and this decision must happen dynamically in an adaptive manner.

Pro-active Routing

The routing decisions need to be made on a pro-active as opposed to an on-demand basis. This ensures that the task of routing does not interfere with the device's primary responsibility, which is to accomplish its own functionality.

Varied Bandwidth/QOS/Power requirements

Devices have varied bandwidth requirements, some need isochronous performance (fixed latency), and some need bounded latency, and some might be power constrained and must use very low power for their transmissions.

Low memory footprint

The design of the algorithm must consider the fact that WPAN would typically consist of low footprint resource constrained devices.

Multi-Zone/Multi-Channel Support

The design of the algorithm must consider the support for routing between multiple Pico-cells or multiple network zones.

Network layer independent

The algorithm must not depend on the existence of a network layer protocol like IP. The algorithm must directly use the services provided by the MAC sub-layer.

Efficient Topology Lookup and Modification

Every device in an AD-HOC WPAN plays dual roles:

- Accomplish its own functionality, which could involve sending packets either directly or via another device. (Primary Role)
- Forward packets of other devices. (Secondary Role)

The design of the algorithm must consider the fact that, the primary role of every device on the network is to accomplish its own functionality, and routing of packets of other devices is secondary (unless the device is a special node that is just present for forwarding) and must not affect the performance of its primary role.

For the primary role, this means whenever the device has to send out its own data packet, to another device the routing decision must be very fast.

For the secondary role, this means whenever a device receives from another source destined to another device, it must be able to readily reference the routing decisions made by the source according to its Bandwidth/QOS/Power requirements.

When a device goes down, the topology and the routing decisions need to be modified in real-time so that network performance levels are maintained.

TECHNOLOGY IMPLEMENTATION

The Algorithm uses control systems approach wherein every device sends out a broadcast heartbeat packet into the medium, at a specified frequency.

Header

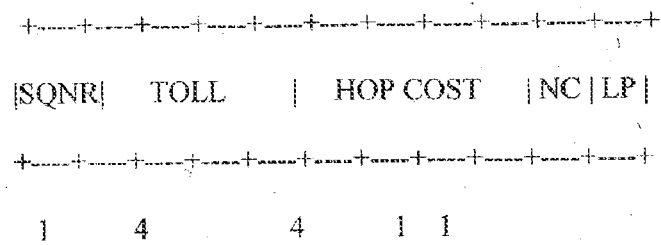

```
+----+----+----+----+----+----+----+----+----+----+----+
|SQNR|   TOLL      |   HOP COST      |NC |LP |
+----+----+----+----+----+----+----+----+----+----+----+
  1       4              4             1   1
```

Payload

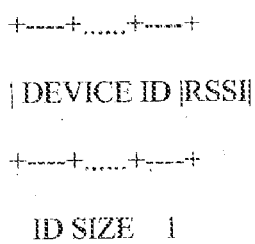

```
+----+......+----+
| DEVICE ID |RSSI|
+----+......+----+
  ID SIZE   1
```

SQNR = 1 BYTE SEQUENCE NUMBER (0-255)

TOLL = 4 BYTE DEVICE TOLL COST

HOP COST = 4 BYTE DEVICE HOP COST

NC = 1 BYTE NEIGHBOUR COUNT (0-255)

LP = 1 BYTE LOW POWER/HIGH THROUGHPUT FLAG

DEVICE ID = DEVICE IDENTIFICATION SEQUENCE (e.g. MAC ADDRESS)

RSSI = 1 BYTE RELATIVE SIGNAL STRENGTH INDEX

TOTAL SIZE OF HEARBEAT PACKET = HEADER SIZE + NC * PAYLOAD SIZE

= 11 + NC * (ID SIZE + 1)

Sequence Number

Sequence Number is a one-byte counter incremented upon the transmission of a heartbeat packet. This counter will wrap to 0 after it reaches a value of 255.

Whenever a device receives a heartbeat packet, it updates the sequence number for the source in its own tables. The device then retransmits the heartbeat packet so that other devices distant from the source can also receive it. If a device receives a heartbeat packet with a sequence number less than or equal to the noted sequence number for the source, the packet is discarded.

The sequence number is significant because of the shared nature of the wireless medium. Lets consider Figure 1 and a scenario where node "2" has just come up.

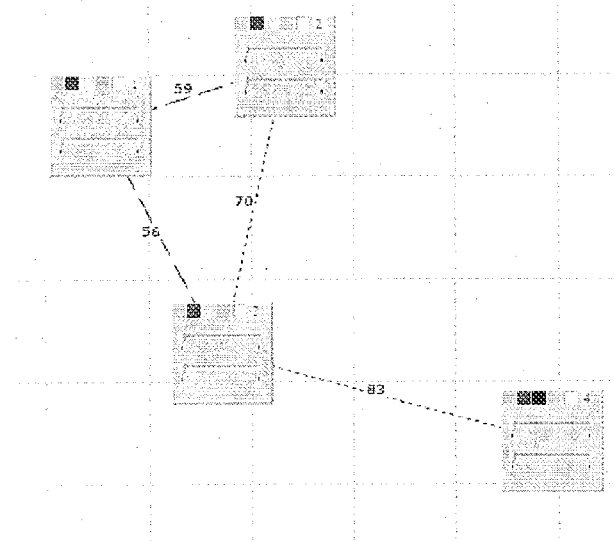

Figure 1

When the node labeled "2" sends out its heartbeat with sequence number "1" node "1" and "3" will hear the packet and update the entry corresponding to node "2" with the value "1". Since both "1" and "3" have heard "2" for the first time, they both will retransmit the packet so that distant devices and new devices which have just come up can receive the heartbeat. Lets assume that node "1" relays the heartbeat first. Nodes "2" and "3" would hear the packet again. "2" would discard it because the original sender is itself, whereas "3" would discard it as its tables already indicate sequence number "1" for node "2".

Now "3" relays the packet and "4" receives it and updates its tables before retransmitting it. For a network with N nodes every heartbeat packet is transmitted N times for the first time. Thus the sequence number helps prevent broadcast flooding for heartbeat packets. This mechanism is only used for the first heartbeat packet. For broadcast/multicast data packets and subsequent heartbeat packets, an optimized technique is used which is discussed below.

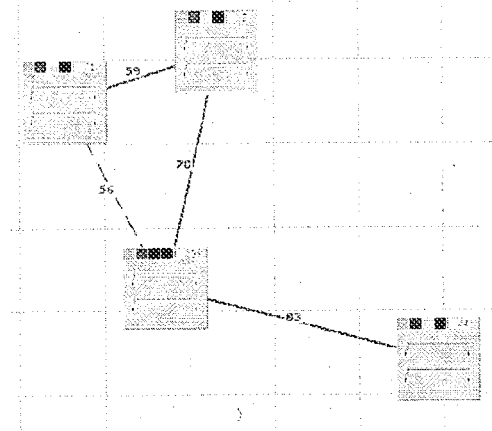

Figure 2

When the node "2" sends out the heartbeat packet with sequence number "2", both 1 and 3 hear the heartbeat and update the table entries corresponding to node "2". Both "1" and "3" would then refer to the Single Source Shortest Path (SSSP) tree corresponding to node "2" as shown by the solid blue lines in Figure 2 above. According to the tree "1" does not have any "child" and hence will not forward the packet further. "3" on the other hand has "4" as its child and hence will forward the packet to "4".

Hence subsequent heartbeat packets are sent $M <= N$ times, where $M$ is the number of levels in the SSSP tree for the source node, and $N$ is the number of devices on the network. If in the mean time another node comes up and hears the heartbeat for the first time, it will retransmit the packet, but the sequence number will help other nodes discard the packet.

Multi-zone/Multi-channel support is explained later in the document for the purposes of brevity.

Device Toll Cost (Dtc)

The Device Toll Cost is the value charged by the device for forwarding a packet to one of its neighbors. This value is used in determining the optimal routes. This value helps in the dynamic adaptive load balancing of the network.

Device Hop Cost (Dhc)

The Device Hop Cost is the expense incurred every time a packet needs to be sent via another device. This value helps in the determining QOS requirements of the node.

Low Power/High Throughput Flag (Lp)

This flag is set to "1" for devices that use a routing table optimized for low power consumption/high throughput.

ALGORITHM DATA-STRUCTURES

Network Representation

The algorithm uses a Directed Weighted Graph (DWG) for representing the networks, which may have unidirectional links and Un-Directed Weighted Graph (UWG) for networks having bidirectional links only. The devices on the network form the set of vertices for the graph. Based on the information in the heartbeat packet, edges are added to the graph with an initial weight that is inversely proportional to the RSSI.

Graph Representation

Traditionally graphs have been represented using either adjacency matrices or adjacency lists. Adjacency matrices offer fast $O(1)$ edge lookup and modification, but tend to be wasteful if the number of edges in the graph is a lot less than $N^2$, where $N$ is the number of devices. The maximum number of edges is $^nP_2$ for a DWG and $^nC_2$ for a UWG.

Practically the number of edges $N_e$ in a WPAN would be much lesser than $^nP_2$ and hence much lesser than $N^2$ number of edges, for $N >= 2$, $^nC_2 < {^nP_2}$, $N_e < {^nC_2} < N^2$.

Adjacency lists on the other hand save memory, but offer $O(M)$ worst-case edge lookup and modification, where $M$ is the number of edges on the list, and hence tend to affect the overall routing performance. The algorithm uses a specialized representation of a graph that offers acceptable performance and has lower runtime memory requirements.

A graph object in the algorithm has the following attributes:
- A vertex hash table for fast vertex lookup and modification
- An edge hash table for fast edge lookup and modification
- A vertex list for vertex enumeration
- An edge list for edge enumeration A vertex object exists in both the graph's vertex hash table and on the graph's vertex list. A vertex object also includes an edge list for all incident edges. In addition, a vertex object also has 2 spare link pointers through which it can exist in 2 more lists.
An edge object on the other hand exists not only on both the graph's edge hash table and the graph's edge list, but also exists on the following:
- If un-directed, on the edge lists of both the vertices it is incident upon
- If directed, on the edge list of the source vertex.

In addition an edge object also has 2 spare link pointers through which it can exist in 2 more lists.

The 2 spare link pointers on the vertex and edge objects are helpful for algorithms that operate on graphs for sorting purposes. These algorithms can sort vertices/edges in any manner they deem without having to allocate/free additional memory.
Graph algorithms can also save custom data pointers within the vertex and edge objects.

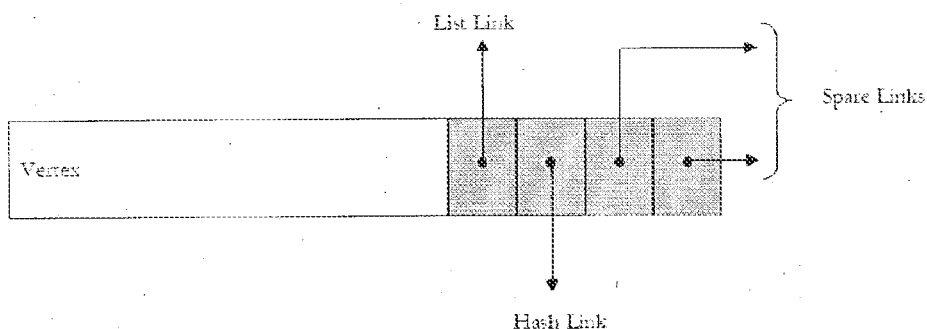

Figure 3

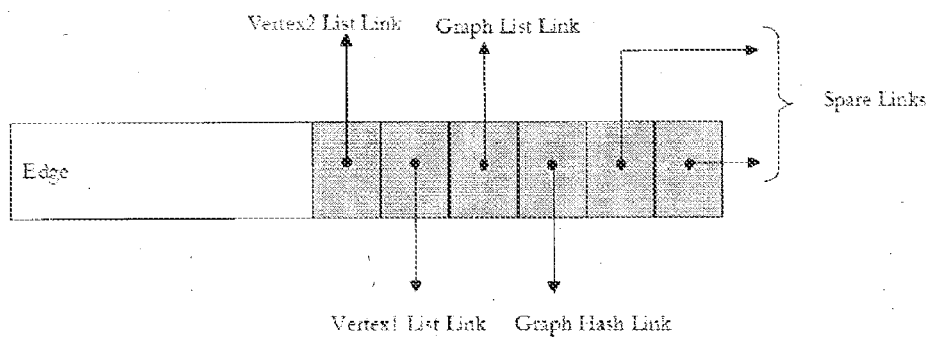

Figure 4

This specialized data structure helps answer the following questions regarding the graph very quickly.

- Is Vertex 'X' on the graph?
- Is there an edge between Vertex 'X' and Vertex 'Y'? If yes what is the initial edge cost?
- What are the edges incident upon Vertex 'Z'?
- Enumeration of all the edges on the graph
- Enumeration of all the vertices on the graph The edge and vertex lookup times are dependant on the bucket size of the hash tables used. The value of the bucket size can be changed as required.

ALGORITHM OPERATION

Direct Heartbeat Reception

Upon receipt of a direct heartbeat (from a source we can directly hear), the algorithm takes the following steps:

1. Lookup vertex for the source. If the vertex is not present, create a new vertex for the source and initialize its corresponding custom vertex data.
2. Lookup edge between the source and us. If an edge is not present, create a new edge between the source and us and initialize its corresponding custom edge data.
3. If the sequence number of the heartbeat is less than or equal to the sequence number noted in the custom vertex data, discard the packet. End.
4. Update the RSSI information and the last known good time in the custom edge data.
5. Update the sequence number, toll cost, hop cost, and low power flag in the custom vertex data.
6. If the source was heard for the first time (an edge was just created), then forward the packet by re-transmitting it, and go to step 8.
7. Lookup our position on the source's SSSP tree. If we have nodes below us on the tree forward the packet by re-transmitting it.
8. For every payload entry
    a. Lookup vertex and create it of not present.
    b. Lookup an edge between the source and the vertex, and create it if not present.
    c. Update the RSSI information and the last known good time in the custom edge data.

In-direct Heartbeat Reception

Upon receipt of an in-direct heartbeat (from a source we cannot directly hear), the algorithm takes the following steps:

1. Lookup vertex for immediate transmitter. If the vertex is not present, create a new vertex for the immediate transmitter and initialize its corresponding custom vertex data.
2. Lookup edge between the immediate transmitter and us. If the edge is not present, create a new edge and initialize its corresponding custom edge data.

3. Lookup vertex for the source. If the vertex is not present, create a new vertex for the source and initialize its corresponding custom vertex data.
4. If the sequence number of the heartbeat is less than or equal to the sequence number entered in the source vertex's custom vertex data, discard the packet. End.
5. Update the RSSI information and the last known good time in the custom edge data, for the immediate sender.
6. Update the sequence number, toll cost, hop cost, and low power flag in the custom vertex data for the source.
7. If the source was heard for the first time (an edge was just created), then forward the packet by re-transmitting it, and go to step 9.
8. Lookup our position on the source's SSSP tree. If we have nodes below us on the tree forward the packet by re-transmitting it.
9. For every payload entry
    a. Lookup vertex and create it of not present.
    b. Lookup an edge between the source and the vertex, and create it if not present.
    c. Update the RSSI information and the last known good time in the custom edge data.

Heartbeat Transmission

Before transmitting the heartbeat packet, the algorithm takes the following steps:

1. Check the last known good timestamp for every edge, and delete edges whose last known good times are greater than $K * U$, where $K >= 2$ is a chosen constant, and $U$ is the heartbeat update interval chosen for the network.
2. Calculate our own Redundancy Index $RI$ for health indication purposes. This is done as follows:
    a. Initialize Good Nodes Count $GNC$ to 0
    b. For every vertex we can reach, using an edge incident upon us, mark the edge as closed, and try to reach the vertex using any other path. If the vertex can be reached, increment $GNC$.
    c. Good Nodes Ratio $GNR = (GNC/TOTAL\_INCIDENT\_EDGES)$
    d. Incidence Ratio $IR = TOTAL\_INCIDENT\_EDGES/(TOTAL\_VERTEX\_COUNT-1)$ e. $RI = (GNR * 0.6 + IR * 0.4)*100$ 3. For every vertex compute the SSSP tree for this vertex, using the SSSP algorithm described below.
4. Add every edge incident upon us to the heartbeat packet and send out the heartbeat packet, with our *DTC*, *DHC* and sequence numbers.
5. Increment sequence number.

Single Source Shortest Path (SSSP) algorithm

The SSSP algorithm used here is a modified version of Dijkstra's SSSP algorithm. The original Dijkstra SSSP algorithm uses pre-computed edge costs, where as in this modified algorithm instead of using the edge costs, we compute the Destination Vertex Cost *DVC* from the RSSI information, dynamically as we proceed in the algorithm. The modified algorithm makes use of the spare links provided by the vertex and edge objects.

1. Initialize the Vertex Cost *VC* to $\infty$, and the Vertex Edge *VE* to *NULL* for all vertices, other than the source. For the source vertex, set *VC* to 0 and *VE* to *NULL*.
2. We use the two spare links provided in the vertex object, to form a doubly linked list of vertices, without having to allocate or free any additional memory. Set the source vertex as the head of this doubly linked list, set the Hop Count *HC* for the source vertex to be 0.
3. For every vertex in the doubly linked list
   a. We use the two spare links provided in the edge object, to form a doubly linked list of edges, without having to allocate or free any additional memory. For every edge incident on the vertex, compute the Final Edge Cost *FEC* using the equation given below.

$FEC = (100 - RSSI) + HC * DHC + TC$ $TC = 0$ if $HC = 0$, $DTC$ if $HC <> 0$

Use insertion sort to insert the edge onto the doubly linked list sorted in ascending order of *FEC*. We call the vertex in context the *Control Vertex*, and the edge destination the *Destination Vertex*.

b. For every edge on the doubly linked list i. Compute *DVC* using the equation given below.

For Low Power Consumption:

*DVC* = MAX (*VC* of *Control Vertex*, *FEC*)

Otherwise:

*DVC* = *VC* of *Control Vertex* + *FEC* ii. If *VC* for *Destination Vertex* = $\infty$ then, set *VC* for *Destination Vertex* to *DVC*, *VE* for *Destination Vertex* to the current edge, *HC* for *Destination Vertex* to *HC* of *Control Vertex* + *1*. Go to Step iv.

iii. If *VC* for *Destination Vertex* > *DVC* then, set *VC* for *Destination Vertex* to *DVC*, *VE* for *Destination Vertex* to current edge, *HC* for *Destination Vertex* to *HC* of *Control Vertex* + *1*. Remove *Destination Vertex* from doubly linked list.

iv. Use insertion sort, to insert *Destination Vertex* into doubly linked list.

4. Create a new graph object for the SSSP tree.
5. Add every vertex in the original graph, to the SSSP tree and every vertex's *VE* to the SSSP tree.

TECHNOLOGY EVALUATION

No Central Control

The implementation of the algorithm makes it clear that it is truly distributed without the need for any central control. The implementer has to choose appropriate values for *K* and *U* depending on the physical characteristics of the network.

Self-Configuring

Any device can join the network instantly. Devices already present on the network can discover the new device after the heartbeat packet transmitted by it is propagated through the network. The device itself can report its health using the value of *RI*. This information can help the user choose an appropriate location for the device.

Self-Healing/Fault Tolerant

The heartbeat packets sent by the devices, make sure that the system can recover from route and device failures.

Dynamic Adaptive Load Balancing

The devices can adaptively increase or decrease the value of their *DTC*, so as to trigger changes in the SSSP trees of other devices. E.g. when a device detects that a lot of devices are using it for forwarding packets, it could adaptively increase its *DTC* so that the traffic then flows through other devices on the network. Similarly when the device detects that the traffic load through it has decreased, it could adaptively decrease its *DTC*.

Pro-Active Routing

The computation of the SSSP tree by every vertex, for every vertex makes the algorithm very pro-active. This means route planning times are minimized at the time of packet sending and forwarding.

Varied Bandwidth/Qos/Power Requirements

The *DHC* value of a device changes the way in which its SSSP tree is computed. Low latency driven devices can set *DHC* to a high value to make sure their SSSP trees are computed with minimum number of hops. Low Power Flag chooses edges so as to minimize the transmit power for the devices.

Low Memory Footprint

The specialized data structures used by the algorithm provided acceptable performance and use reasonably low memory. For a network with very large number of devices e.g. 10,000, the network could be divided into multiple zones, so as to provide acceptable performance using low memory. Multi-Zoning is explained in the next section.

Multi-Zone/Multi-Channel Support

A WPAN can be divided into 2 or more Pico-nets using different RF channels, so as to minimize the interference between them. Two attractive approaches are explained below.

Common Device Approach

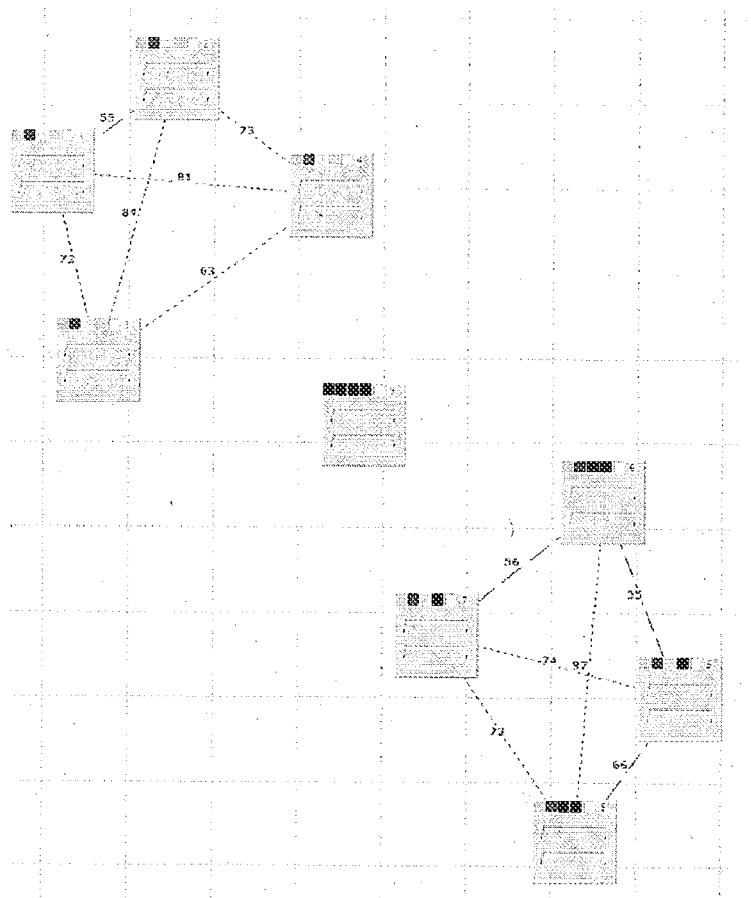

Figure 5

Figure 5 shows two Pico-nets comprising of nodes (1,2,3,4) and (5,6,7,8) respectively. Both Pico-nets are operating on different RF channels so as to not interfere with each other. Node 9 is a node having two interfaces, one listening to the RF channel for the first Pico-net and the other listening to the RF channel for the second Pico-net. Hence Node 9 is designated as the *Common Device*.

When Node 9 is turned off both Pico-nets can only operate independently.

When Node 9 is turned on both Pico-nets can now not only work independently, but can also use Node 9 to route information between the Pico-nets. Node 9 ensures that the heartbeat packets generated in both Pico-nets are forwarded to the other Pico-net. Thus devices of both Pico-nets view the network as one combined Pico-net.

Common Router Approach

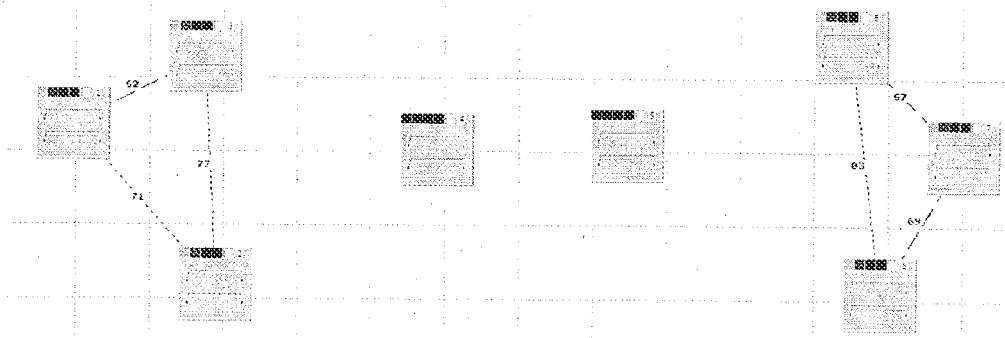

Figure 7

Figure 7 above shows two Pico-nets comprising of Nodes (1,2,3,4) and (5,6,7,8) respectively. Here the Nodes 4 and 5 have been designated as *Common Routers*. Separate RF channels are used for the Intra Pico-net and Inter Pico-net communications. When the *Common Routers* are turned off, both Pico-nets can only work independently.

Figure 8:
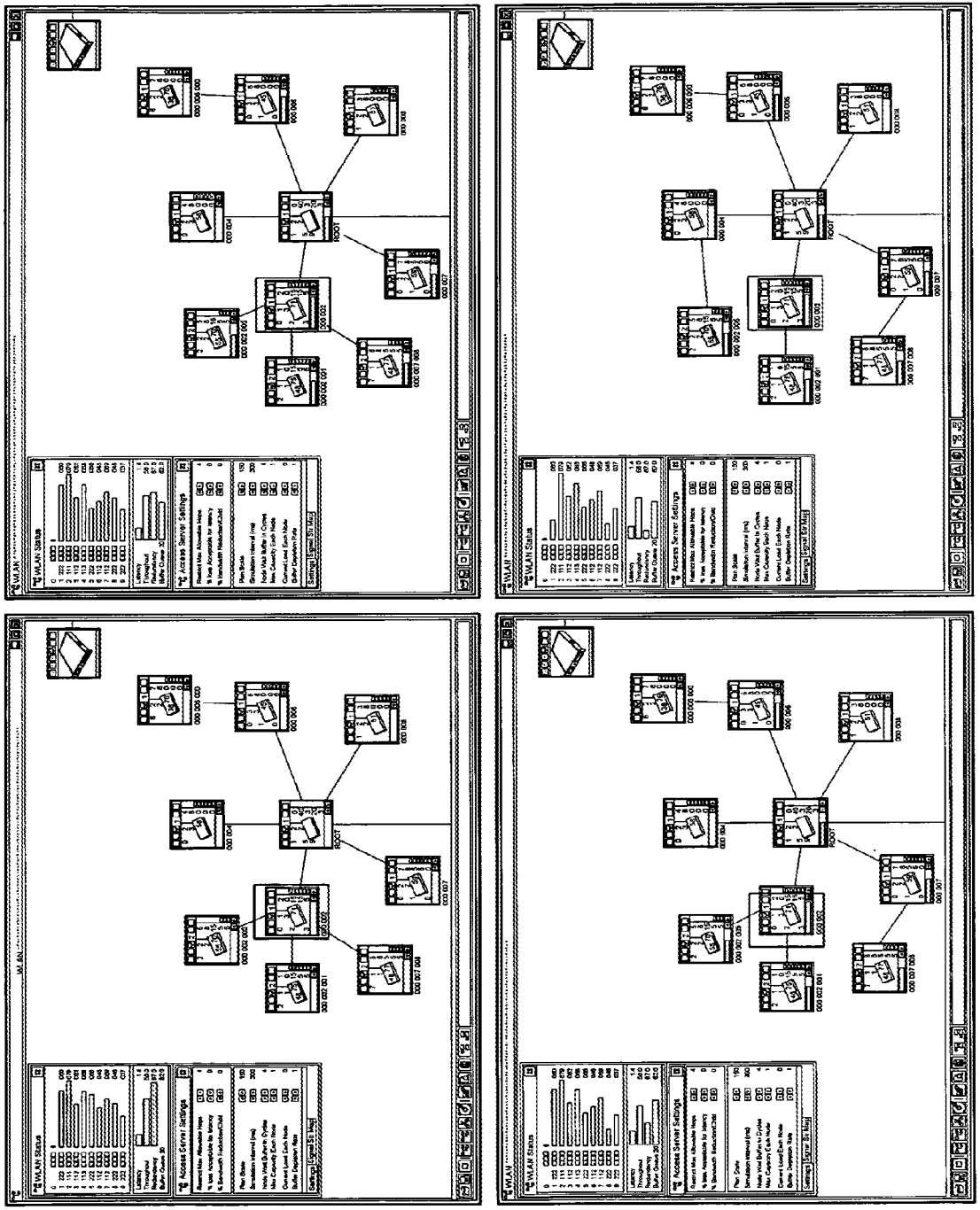
FIG. 8 illustrates how progressively increasing the cost of connectivity causes children to seek other routes according to an embodiment of the present invention.

When the *Common Routers* are turned on, the Figures 8 and 9 below show the Intra Pico-net SSSP trees of both Pico-nets respectively. Figure 10 shows the entire topology.

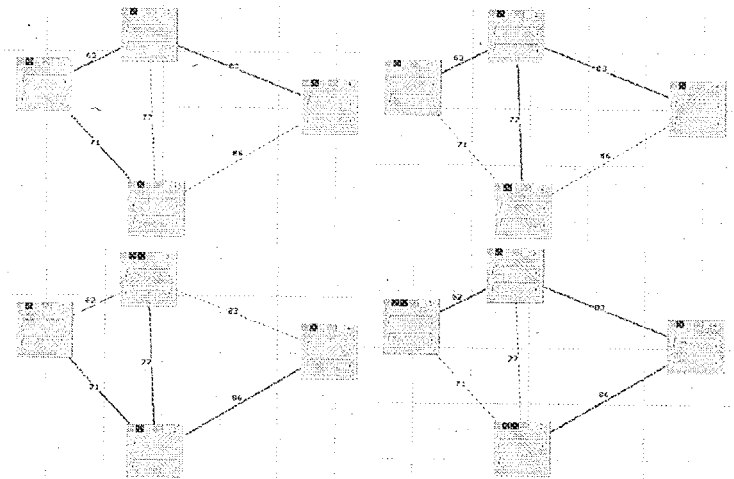

Figure 8

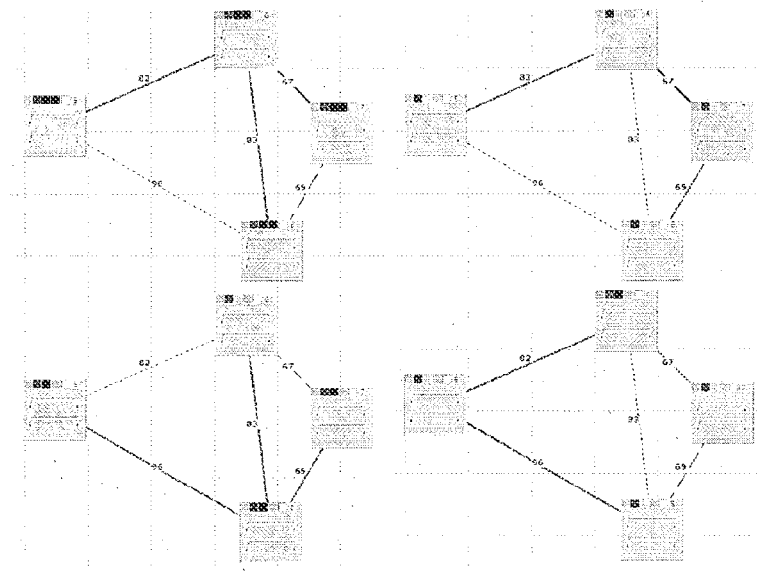

Figure 9

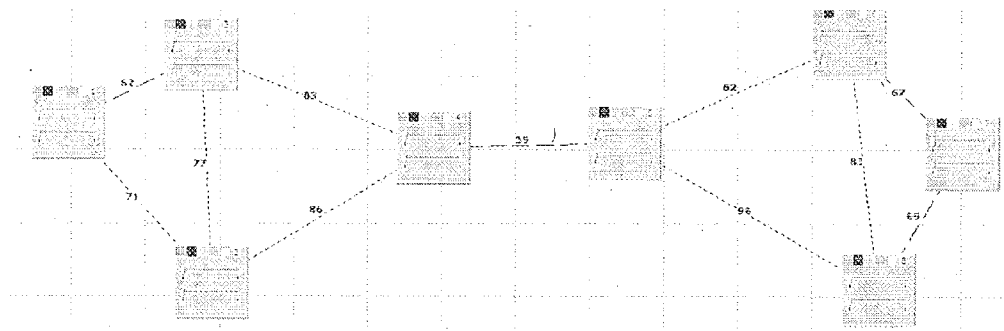

Figure 10

The heartbeat packets transmitted by the *Common Routers* are different for Inter Pico-net and Intra Pico-net communication. For Intra Pico-net communications, the *Common Routers* include only the Pico-net members they hear in their heartbeat packets. Hence for the first Pico-net, the Intra Pico-net heartbeat sent out by 4 would include entries for Nodes 1,2 and 3. Even though Node 4 can also hear Node 5, the Intra Pico-net will not have an entry for Node 5.

The Inter Pico-net heartbeat transmitted by Node 4 will include entries for Nodes 1,2,3 and 5. Hence only the *Common Routers* will need to know about the entire topology, whereas individual devices will only need to know the topology of their Pico-net.
Whenever a device needs to send a packet to a device that is outside its Pico-net, the packet is sent to the *Common Router* for that Pico-net.

Network Layer Independent

Clearly the algorithm described does not depend on any Network Layer protocol like IP. This algorithm is also independent of the MAC sub-layer although its use is intended to be at the MAC sub-layer.

Efficient Topology Lookup And Modification

The specialized graph data structures used by the algorithm are designed for efficient topology lookup, offering acceptable performance over a reasonably large number of nodes.

The invention claimed is:

1. A wireless mesh network comprising:
a plurality of Wi-Fi nodes in the wireless mesh network organized in a tree shape;
an access server in data communication with the nodes, wherein the nodes are comprised of:
one or more root access point (RAP) nodes having a wired connection to an external network;
one or more mesh access point (MAP) nodes;
wherein a MAP node is in a data communication with the external network through an associated RAP node;
wherein the MAP node is in a direct wireless data communication with a single associated parent node, wherein the associated parent node is either the associated RAP node, or another MAP node in a data communication with the external network through its associated RAP node;
wherein the MAP node automatically connects to the associated parent node by selecting the single associated parent node from one or more potential parent nodes that are within a direct wireless communication range of the MAP node and establishing a parent-child relationship with the associated parent node, process for the automatic connection comprising:
selecting a parent node from the one or more potential parent nodes based at least in part on one or more parent selection criteria defined by the access server, wherein the parent node so selected is the associated parent node; and
establishing a direct wireless data connection between the MAP node and the associated parent node;
wherein the automatic connection process establishes the MAP node's routing path to the external network;
the one or more parent selection criteria comprising:
a throughput value representing signal strength between two nodes; and
a latency value representing number of hops in a routing path;
the MAP node comprising:
one or more identifier values representing a unique identity of the MAP node in the wireless mesh network;
two or more radios for wirelessly communicating with another node or a client device in the wireless mesh network.

2. The wireless mesh network of claim 1 further comprising:
one or more network health monitoring criteria defined by the access server, wherein the one or more network health monitoring criteria comprises one or more of:
whether or not the associated parent node is offline or can be found in the wireless mesh network;
whether or not data can be routed to the external network through the MAP node's routing path;
whether or not the one or more parent selection criteria is satisfied; and
testing whether the MAP node's routing path fails to satisfy the one or more network health monitoring criteria;
when it is determined that the MAP node's routing path does not meet one or more of the one or more network health monitoring criteria, establishing a new routing path from the MAP node to the external network by connecting the MAP node to a new associated parent node through the automatic connection process.

3. The wireless mesh network of claim 2 wherein the access server further comprises causing an update to the wireless mesh network, the update comprising one or more of: a change to the one or more parent selection criteria, a change to the one or more network health monitoring criteria, and an upgrade of software or firmware residing on at least some of the nodes.

4. The wireless mesh network of claim 2 wherein the at least one of the one or more network health monitoring criteria overlap with at least one of the one or more parent selection criteria.

5. The wireless mesh network of claim 1 wherein the selection of the parent node further comprises selecting a potential parent node over another potential parent node based at least in part on a comparison of their latency values.

6. The wireless mesh network of claim 5 wherein the selection of the parent node further comprises selecting the potential parent node over the another potential parent node if the potential parent node has a lower latency value than the another potential parent node.

7. The wireless mesh network of claim 1 wherein the selection of the parent node further comprises selecting a potential parent node over another potential parent node based at least in part on a comparison of their throughput values.

8. The wireless mesh network of claim 7 wherein the selection of the parent node further comprises selecting the potential parent node over the another potential parent node if the potential parent node has a higher throughput value than the another potential parent node.

9. The wireless mesh network of claim 1 wherein the selection of the parent node further comprises not selecting a potential parent node if the potential parent node's wireless signal strength with the MAP node does not meet a threshold throughput value defined by the access server.

10. The wireless mesh network of claim 1 wherein the MAP node further comprises a data store having data representing the MAP node's routing path to the external network.

11. The wireless mesh network of claim 1 wherein the MAP node further comprises: an ethernet port through which a direct wired connection can be established with another device.

12. The wireless mesh network of claim 1 wherein the one or more identifier values of the MAP comprises a MAC address or an IP address.

13. The wireless mesh network of claim 1 wherein a first radio of the MAP is adapted for communicating with the client device and wherein a second radio is adapted for communicating with another node.

14. The wireless mesh network of claim 13, wherein the second radio is configurable to be used as a dual-purpose radio for communicating with both the client and another node.

15. The wireless mesh network of claim 1 further comprising a client device wirelessly connected to the MAP node, wherein the client device exchanges data with the external network through the MAP's routing path to the external network.

16. The wireless mesh network of claim 1 further comprising one or more data types being routed through the routing path, wherein the one or more data types include at least two of: voice data, video data, and other data type that is not the voice or video data; wherein routing a priority data type with a higher priority than another type of data, wherein the priority data type may be one or both of: the voice data or the video data.

17. A wireless mesh network comprising:
a plurality of Wi-Fi nodes in the wireless mesh network organized in a tree shape;
an access server in data communication with the nodes, wherein the nodes are comprised of:
one or more root access point (RAP) nodes having a wired connection to an external network;
one or more mesh access point (MAP) nodes;
wherein a MAP node is in a data communication with the external network through an associated RAP node;
wherein the MAP node is in a direct wireless data communication with a single associated parent node, wherein the associated parent node is either the associated RAP node, or another MAP node in a data communication with the external network through its associated RAP node;
wherein the MAP node automatically connects to the associated parent node by selecting the single associated parent node from one or more potential parent nodes that are within a direct wireless communication range of the MAP node and establishing a parent-child relationship with the associated parent node, process for the automatic connection comprising:
selecting a parent node from the one or more potential parent nodes based at least in part on one or more parent selection criteria defined by the access server, wherein the parent node so selected is the associated parent node; and
establishing a direct wireless data connection between the MAP node and the associated parent node;
wherein the automatic connection process establishes the MAP node's routing path to the external network;
the one or more parent selection criteria comprising:
a throughput value representing signal strength between two nodes; and
a latency value representing number of hops in a routing path;
the MAP node comprising:
one or more identifier values representing a unique identity of the MAP node in the wireless mesh network;
two or more radios for wirelessly communicating with another node or a client device in the wireless mesh network;
one or more network health monitoring criteria defined by the access server, wherein the one or more network health monitoring criteria comprises one or more of:
whether or not the associated parent node is offline or can be found in the wireless mesh network;
whether or not data can be routed to the external network through the MAP node's routing path;
whether or not the one or more parent selection criteria is satisfied; and
whether or not the MAP node's routing path is more congested than a threshold load value representing data congestion level of a routing path;
testing whether the MAP node's routing path fails to satisfy the one or more network health monitoring criteria;
when it is determined that the MAP node's routing path does not meet one or more of the one or more network health monitoring criteria, establishing a new routing path from the MAP node to the external network by connecting the MAP node to a new associated parent node through the automatic connection process.

18. A wireless mesh network comprising:
a plurality of Wi-Fi nodes in the wireless mesh network organized in a tree shape;
an access server in data communication with the nodes, wherein the nodes are comprised of:
one or more root access point (RAP) nodes having a wired connection to an external network;
one or more mesh access point (MAP) nodes;
wherein a MAP node is in a data communication with the external network through an associated RAP node;
wherein the MAP node is in a direct wireless data communication with an a single associated parent node, wherein the associated parent node is either the associated RAP node, or another MAP node in a data communication with the external network through its associated RAP node;
wherein the MAP node automatically connects to the associated parent node by selecting the single associated parent node from one or more potential parent nodes that are within a direct wireless communication range of the MAP node and establishing a parent-child relationship with the associated parent node, process for the automatic connection comprising:
selecting a parent node from the one or more potential parent nodes based at least in part on one or more parent selection criteria defined by the access server, wherein the parent node so selected is the associated parent node; and
establishing a direct wireless data connection between the MAP node and the associated parent node;
wherein the automatic connection process establishes the MAP node's routing path to the external network;
the one or more parent selection criteria comprising:
a loop prevention criterion which verifies that a potential parent node's routing path to the external network does not contain the MAP node;
a throughput value representing signal strength between two nodes; and
a latency value representing number of hops in a routing path;
the MAP node comprising:
one or more identifier values representing a unique identity of the MAP node in the wireless mesh network;
two or more radios for wirelessly communicating with another node or a client device in the wireless mesh network.

19. The wireless mesh network of claim 18 wherein the selection of the parent node further comprises not selecting a potential parent node if the MAP node's potential routing path to the external network through the potential parent node exceeds a threshold latency value.

* * * * *